United States Patent
Mitchell et al.

(10) Patent No.: US 10,500,427 B2
(45) Date of Patent: Dec. 10, 2019

(54) ADJUSTABLE BRACKET AND HUB FOR FLEXIBLE HOSE SUPPORT

(71) Applicant: Anvil International, LLC, Exeter, NH (US)

(72) Inventors: Stephen Mitchell, Windham, NH (US); Mike Dooley, Holliston, MA (US); Odair Dafonseca, Pawtucket, RI (US); Yoram Ringer, Providence, RI (US)

(73) Assignee: Anvil International, LLC, Exeter, NH (US)

( * ) Notice: Subject to any disclaimer, the term of this patent is extended or adjusted under 35 U.S.C. 154(b) by 22 days.

(21) Appl. No.: 15/894,094

(22) Filed: Feb. 12, 2018

(65) Prior Publication Data

US 2018/0161612 A1   Jun. 14, 2018

Related U.S. Application Data

(63) Continuation of application No. 14/750,506, filed on Jun. 25, 2015, now Pat. No. 9,889,327.
(Continued)

(51) Int. Cl.
*F16L 3/08* (2006.01)
*A62C 35/68* (2006.01)
(Continued)

(52) U.S. Cl.
CPC ............ *A62C 35/68* (2013.01); *F16L 3/1075* (2013.01); *F16L 3/24* (2013.01); *F16B 2/10* (2013.01)

(58) Field of Classification Search
CPC ............ A62C 35/68; E04B 9/006; F16L 3/24
See application file for complete search history.

(56) References Cited

U.S. PATENT DOCUMENTS 1,056,759 A   3/1913   Mallery et al.
1,156,885 A   10/1915   Caine et al.
(Continued)

FOREIGN PATENT DOCUMENTS

DE   3919638   11/1990
JP   U-55-40163   3/1980
(Continued)

OTHER PUBLICATIONS

Mitchell, Stephen; Office Action for Canadian application No. 2,895,800, filed Jun. 26, 2015, dated Sep. 28, 2018, 9 pgs.
(Continued)

*Primary Examiner* — Bradley Duckworth
(74) *Attorney, Agent, or Firm* — Taylor English Duma LLP

(57) ABSTRACT

An adjustable bracket includes a first bracket portion with a first leg and a first bar element, a second bracket portion with a second leg and a second bar element, and a hub assembly supported on at least one of the first and second bracket portions. The hub assembly can be configured to couple a flexible hose to the adjustable bracket. The first bar element can be telescopically received by the second bar element so that a distance between the first and second legs is selectively adjustable. A fastener can fix the first and second bar elements in a desired relationship. The hub assembly can include first and second support members that are pivotably connected to rotate between open and closed positions. The second support member may have a slot that allows the second support member to rotate and move laterally with respect to the first support member.

23 Claims, 38 Drawing Sheets

Related U.S. Application Data

(60) Provisional application No. 62/087,295, filed on Dec. 4, 2014, provisional application No. 62/017,911, filed on Jun. 27, 2014.

(51) Int. Cl.
*F16L 3/10* (2006.01)
*F16L 3/24* (2006.01)
*F16B 2/10* (2006.01)

(56) References Cited

U.S. PATENT DOCUMENTS

| | | |
|---|---|---|
| 1,496,466 A | 6/1924 | Calvin et al. |
| 2,375,513 A | 5/1945 | Bach et al. |
| 2,998,217 A | 8/1961 | Englis et al. |
| 3,104,087 A | 9/1963 | Budnick |
| 3,191,974 A | 6/1965 | Mann et al. |
| 3,341,909 A | 9/1967 | Havener et al. |
| 3,529,671 A | 9/1970 | Adams et al. |
| 3,556,452 A | 1/1971 | Ramsey et al. |
| 3,558,091 A | 1/1971 | Bush et al. |
| 3,597,889 A | 8/1971 | Nigro et al. |
| 3,608,857 A | 9/1971 | Hibbeler et al. |
| 3,612,461 A | 10/1971 | Brown et al. |
| 3,652,780 A | 3/1972 | Wilson et al. |
| 3,675,952 A | 7/1972 | Mears et al. |
| 3,685,235 A | 8/1972 | Lang et al. |
| 3,703,307 A | 11/1972 | Curtis et al. |
| 3,797,789 A | 3/1974 | Wasson |
| 3,848,385 A | 11/1974 | Thompson |
| 3,874,035 A | 4/1975 | Schuplin |
| 4,009,507 A | 3/1977 | Lascarrou |
| 4,041,657 A | 8/1977 | Schuplin |
| 4,122,762 A | 10/1978 | Williams |
| 4,135,692 A | 1/1979 | Ferguson |
| 4,149,693 A | 4/1979 | LoNigro |
| 4,408,428 A | 10/1983 | Brooke et al. |
| 4,484,634 A | 11/1984 | Swanson et al. |
| 4,544,119 A | 10/1985 | Kellett et al. |
| 4,717,099 A | 1/1988 | Hubbard |
| 4,723,749 A | 2/1988 | Carraro et al. |
| 4,785,887 A | 11/1988 | Miller |
| 4,834,186 A | 5/1989 | Ballard |
| 4,905,952 A | 3/1990 | Pinquist |
| 4,964,470 A | 10/1990 | Gaulin |
| 5,018,586 A | 5/1991 | Cawley et al. |
| 5,060,892 A | 10/1991 | Dougherty |
| 5,085,393 A | 2/1992 | Ryan |
| 5,127,497 A | 7/1992 | Struckmeyer et al. |
| 5,316,254 A | 5/1994 | McCartha |
| 5,327,976 A | 7/1994 | Hattori |
| 5,396,959 A | 3/1995 | Macdonald |
| 5,516,068 A | 5/1996 | Rice |
| 5,564,505 A | 10/1996 | Moliere |
| 5,570,745 A | 11/1996 | MacDonald, III |
| 5,595,363 A | 1/1997 | De Leebeeck |
| 5,609,212 A | 3/1997 | McHugh |
| 5,619,263 A | 4/1997 | Laughlin et al. |
| 5,667,018 A | 9/1997 | Hone et al. |
| 5,667,181 A | 9/1997 | van Leeuwen et al. |
| 5,699,641 A | 12/1997 | Tinen et al. |
| 5,743,337 A | 4/1998 | MacDonald, III |
| 5,794,853 A | 8/1998 | Perkins |
| 5,842,526 A | 12/1998 | Archer et al. |
| 5,845,886 A | 12/1998 | McCormick |
| 6,119,784 A | 9/2000 | MacDonald, III et al. |
| 6,123,154 A | 9/2000 | MacDonald, III et al. |
| 6,260,810 B1 | 7/2001 | Choi |
| 6,283,425 B1 | 9/2001 | Liljevik |
| 6,341,466 B1 | 1/2002 | Kehoe et al. |
| 6,345,415 B1 | 2/2002 | Laning |
| 6,345,800 B1 | 2/2002 | Herst et al. |
| 6,450,465 B1 | 9/2002 | Eslick |
| 6,488,097 B1 | 12/2002 | MacDonald, III et al. |
| 6,554,231 B2 | 4/2003 | Choi |
| D489,000 S | 4/2004 | Ellery |
| 6,752,218 B2 | 6/2004 | MacDonald, III et al. |
| 6,786,302 B2 | 9/2004 | Liew et al. |
| 6,811,130 B1 | 11/2004 | Oh |
| 6,843,394 B2 | 1/2005 | Aki |
| 6,948,878 B1 | 9/2005 | Smith, Jr. et al. |
| 7,032,680 B2 | 4/2006 | MacDonald, III et al. |
| 7,255,315 B2 | 8/2007 | Oh |
| 7,264,214 B2 | 9/2007 | Oh |
| 7,427,051 B2 | 9/2008 | Oh |
| 7,506,845 B2 | 3/2009 | Oh |
| 7,735,787 B2 | 6/2010 | Kafenshtok et al. |
| 7,784,746 B2 | 8/2010 | Kafenshtok et al. |
| 7,845,599 B2 | 12/2010 | Jackson |
| 7,878,464 B2 | 2/2011 | Oh |
| 7,954,771 B2 | 6/2011 | Paulig |
| 8,100,368 B2 | 1/2012 | Jackson et al. |
| 8,109,482 B2 | 2/2012 | Oh |
| 8,272,615 B2 | 9/2012 | Silcox |
| 8,413,734 B2 | 4/2013 | Silcox |
| 8,474,199 B2 | 7/2013 | Oh |
| 8,500,079 B2 | 8/2013 | Oh |
| 8,740,158 B2 | 6/2014 | Silcox |
| 9,004,422 B2 | 4/2015 | Feenstra |
| 9,022,326 B2 | 5/2015 | Brown |
| 9,174,077 B2 | 11/2015 | Lim |
| 9,255,652 B2 | 2/2016 | Kim |
| 9,278,238 B2 | 3/2016 | Thau |
| 9,308,407 B2 | 4/2016 | Jung |
| 9,341,286 B1 | 5/2016 | Oh |
| 9,718,076 B2 | 8/2017 | Oh |
| 9,889,327 B2 | 2/2018 | Mitchell et al. |
| 2003/0029983 A1 | 2/2003 | Pfaller |
| 2007/0131823 A1 | 6/2007 | Mominee et al. |
| 2008/0099640 A1 | 5/2008 | Kafenshtok et al. |
| 2008/0230238 A1 | 9/2008 | Jackson |
| 2011/0094760 A1* | 4/2011 | Im .......................... A62C 35/68 |
| | | 169/51 |
| 2011/0154755 A1 | 6/2011 | Oh |
| 2011/0215566 A1 | 9/2011 | Stempo et al. |
| 2013/0104494 A1 | 5/2013 | Evangelista et al. |
| 2015/0377386 A1 | 12/2015 | Mitchell et al. |
| 2017/0197101 A1 | 7/2017 | Chong |

FOREIGN PATENT DOCUMENTS

| | | |
|---|---|---|
| JP | 2-96160 | 7/1990 |
| JP | 2-010 | 11/1990 |
| JP | 4-189948 | 7/1992 |
| JP | 4361759 | 12/1992 |
| JP | 560283 | 3/1993 |
| JP | 584321 | 4/1993 |
| JP | 5137810 | 6/1993 |
| JP | 5-309146 | 11/1993 |
| JP | 5329223 | 12/1993 |
| JP | 4-5971 | 1/1994 |
| JP | 6-23064 | 2/1994 |
| JP | 6125999 | 5/1994 |
| JP | 6-201071 | 7/1994 |
| JP | 6-83047 | 11/1994 |
| JP | 6-337082 | 12/1994 |
| JP | 7-17259 | 3/1995 |
| JP | 7096050 | 4/1995 |
| JP | 7-151269 | 6/1995 |
| JP | 7-166634 | 6/1995 |
| JP | 8038641 | 2/1996 |
| JP | 9-655 | 1/1997 |
| JP | 9-28829 | 2/1997 |
| JP | 9-196241 | 7/1997 |
| JP | 1043325 | 2/1998 |
| KR | 91-2450 | 1/1992 |
| KR | 93-4992 | 7/1993 |
| KR | 1796 | 7/1993 |
| KR | 94-9689 | 10/1994 |
| KR | 176800 | 3/1996 |
| KR | 94-19364 | 4/1996 |
| KR | 94-023229 | 4/1996 |
| KR | 97-53081 | 10/1997 |

(56) References Cited

FOREIGN PATENT DOCUMENTS

| KR | 0117170 | 1/1998 |
|---|---|---|
| KR | 118091 | 2/1998 |
| KR | 1337-32 | 5/1999 |
| WO | WO2009082082 A1 | 7/2009 |

OTHER PUBLICATIONS

Mitchell, Stephen; Office Action for Mexico application No. MX/a/2015/008379, filed Jun. 25, 2015, dated Oct. 5, 2018, 7 pgs.
Mitchell, Stephen; Issue Notification for U.S. Appl. No. 14/750,506, filed Jun. 25, 2015, dated Jan. 24, 2018.
Mitchell, Stephen; Non-Final Office Action for U.S. Appl. No. 14/750,506, filed Jun. 25, 2015, dated Sep. 7, 2017, 26 pgs.
Mitchell, Stephen; Notice of Allowance for U.S. Appl. No. 14/750,506, filed Jun. 25, 2015, dated Oct. 5, 2017, 5 pgs.
Mitchell, Stephen; Requirement for Restriction/Election for U.S. Appl. No. 14/750,506, filed Jun. 25, 2015, dated Jul. 25, 2017, 5 pgs.
Mitchell, Stephen; Office Action for Mexico application No. MX/a/2015/008379, filed Jun. 25, 2015, dated Jul. 16, 2018, 5 pgs.
Mitchell, Stephen; Office Action for Canadian application No. 2,895,800, filed Jun. 26, 2015, dated Jan. 2, 2019, 4 pgs.
Standard Specifications for Nonstructural Steel Framing Members, ASTM International, Aug. 29, 2008.
Standard Specifications for the Manufacture, Performance, and Testing of Metal Suspension Systems for Acoustical Tile and lay-in Panel Ceilings, ASTM International, Oct. 2004.
Standard Practice for Installation of Metal Ceiling Suspension Systems for Acoustical Tile and Lay-in Paneals, ASTMA International, Jun. 10, 2004.
Standard Practice for Applications for Ceiling Suspension Systems for Acoustical Tile and Lay-in Panels in Areas Requiring Seismic Restraint, ASTM International, May 31, 2006.
Standard Specifications for Installation of Steel Framing Members to Receive Screw-Attached Gypsum Panel Products, ASTM International, Aug. 28, 2008.
Tyco Fire Suppression and building Products, FastFlex Model YN25, YB25, and YB28 Flexible Sprinkler Hose 700mm to 3700mm Nominal Assembly Lengths, Jul. 2009, pp. 1-3.
Mitchell, Stephen; Office Action for Mexico patent application No. MX/a/2018/014708, filed Jun. 25, 2015, dated Jun. 24, 2019, 8 pgs.

\* cited by examiner

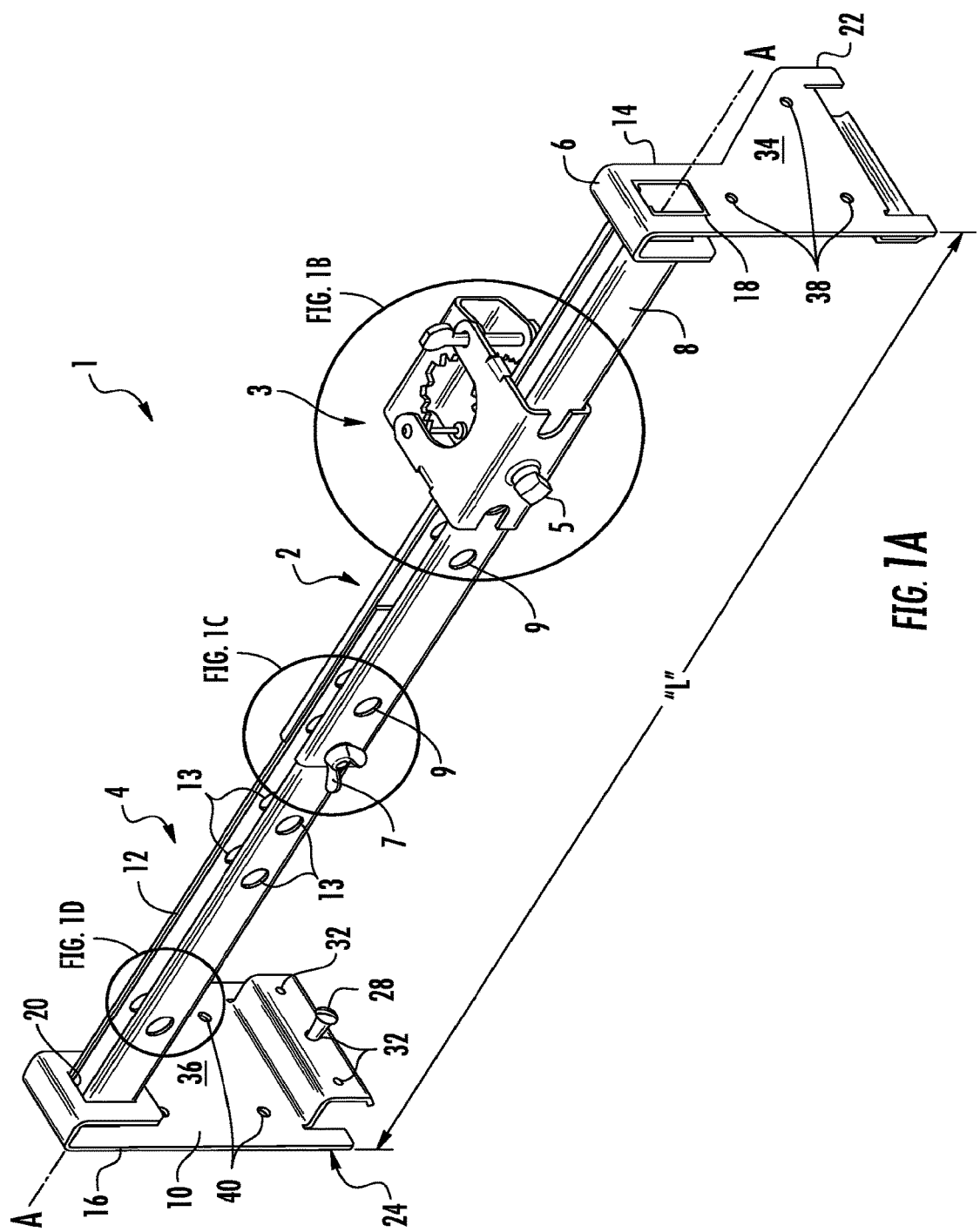

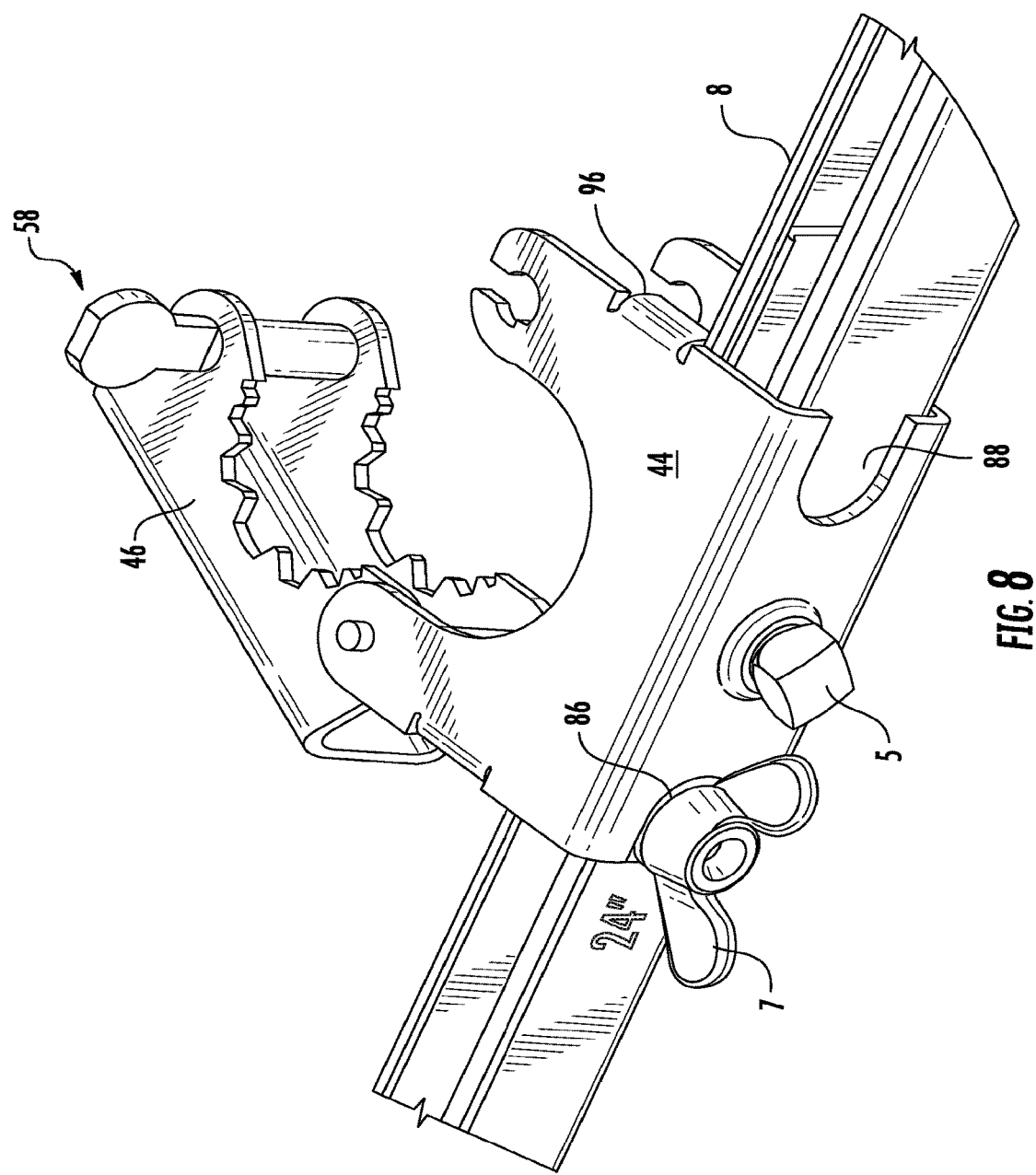

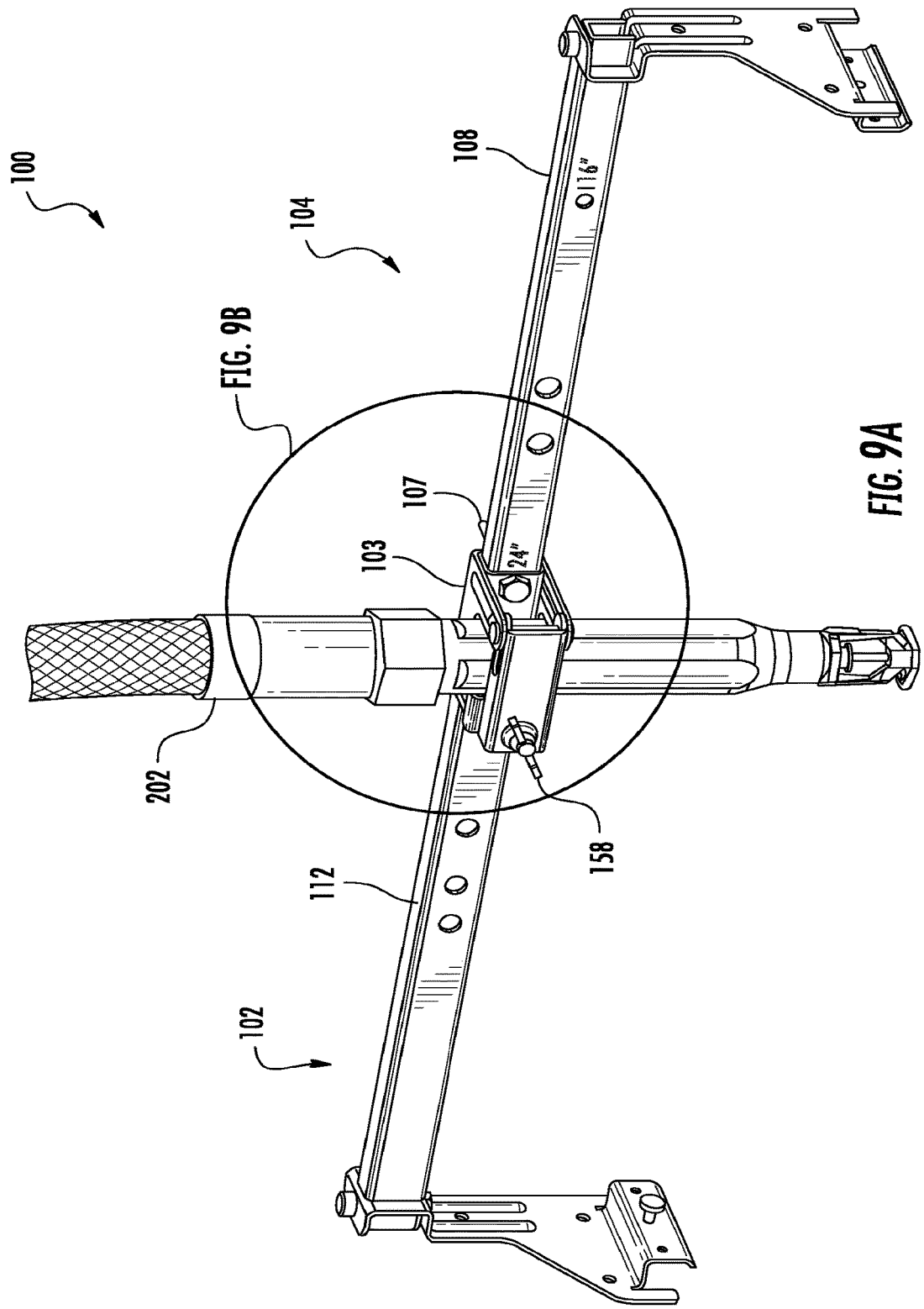

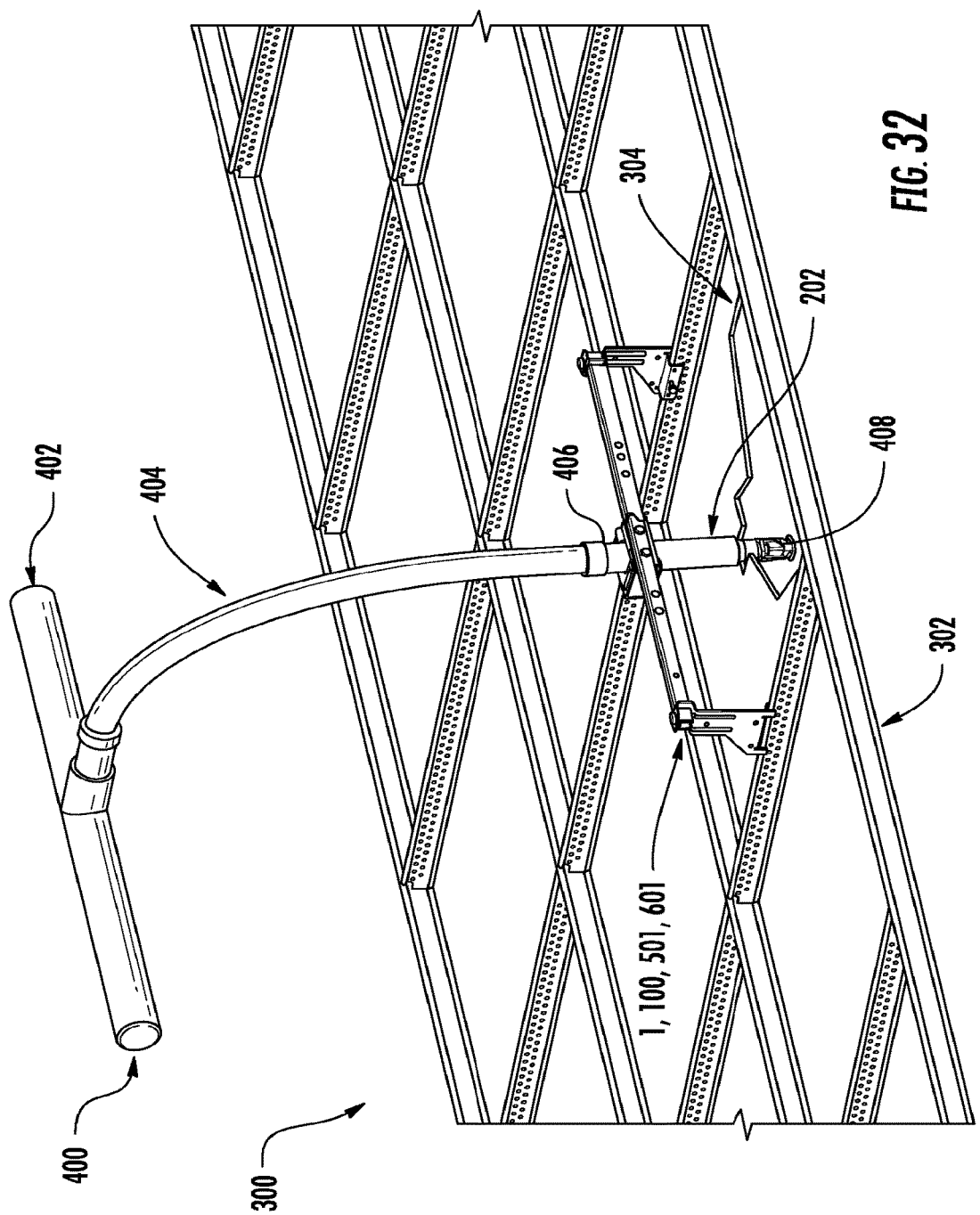

ADJUSTABLE BRACKET AND HUB FOR FLEXIBLE HOSE SUPPORT

CROSS-REFERENCE TO RELATED APPLICATIONS

This is a continuation application of, and claims priority to, U.S. non-provisional patent application Ser. No. 14/750,506 filed Jun. 25, 2015 entitled "ADJUSTABLE BRACKET FOR FLEXIBLE HOSE SUPPORT", and claims priority to, U.S. provisional patent application Ser. No. 62/017,911 filed Jun. 27, 2014 entitled "ADJUSTABLE BRACKET FOR FLEXIBLE HOSE SUPPORT" and U.S. provisional patent application Ser. No. 62/087,295 filed Dec. 4, 2014 "ADJUSTABLE BRACKET AND HUB FOR FLEXIBLE HOSE SUPPORT," the entirety of which provisional patent applications re incorporated by reference herein.

FIELD OF THE DISCLOSURE

Embodiments of the invention generally relate to the field of mounting brackets, and more particularly to the field of mounting brackets for use in securing flexible sprinkler hoses to ceiling structures.

DISCUSSION OF RELATED ART

Automatic fire sprinkler systems often include a network of pipes that carry a fire suppression fluid, e.g., water, to each room in a building. Conduit sections carry the fluid from the pipes to sprinkler heads which are strategically located in different rooms. The position and orientation of each sprinkler head is often maintained in place by a support assembly. The support assembly is used to hold the sprinkler head securely in place during operation. When the room reaches an elevated temperature due to a fire, the sprinkler head is activated allowing a stream of fire suppression fluid to be directed over the intended area of coverage.

Some known sprinkler support assemblies are designed to secure a sprinkler head at a predetermined position within ceiling systems that can be formed an array of cross-members. The same support assemblies can also be used to secure a sprinkler head to ceiling studs. However, such cross-members may be spaced apart at different intervals depending upon the size of the ceiling tile being used Likewise, ceiling studs may have different spacings depending upon the structural requirements of the building.

In addition, some known sprinkler support assemblies require installation of the drop ceiling first, followed by installation of the sprinkler head. As will be appreciated, this makes the installation a more costly and difficult process.

SUMMARY OF THE DISCLOSURE

In view of the foregoing, a bracket is disclosed for supporting a flexible hose, and more particularly for supporting flexible sprinkler hose. A method is also disclosed for installing such a bracket. The bracket can be easily adjusted to fit to a variety of ceiling structure spacings. The disclosed bracket also includes features that enables installation of ceiling tiles after installation of the sprinkler head.

The bracket can include two main bracket components, one right and one left, one of which slides into the other allowing the assembly to assume different sizes to fit a variety of ceiling spaces. The bracket can be used with an open hub that couples a flex hose to the bracket. The bracket and hub can be designed to fix a sprinkler head, which is coupled to the flex hose, in the center of the bracket base which is connected to the ceiling support structure, thus reducing the forces on the connecting screw and allowing for easier installation. Providing a single bracket, which is adjustable for all sizes, can reduce inventory and also can allow for smaller packaging for shipping.

The bracket can be installed by engaging portions of opposite legs to ceiling structural elements using fasteners. By way of example, the fastener may be a self-tapping screw, which may be pre-installed in the bracket. The flexible hose may be installed by inserting it between a primary support and a secondary support of the hub and releasably locking the secondary support to the primary support. This may be done via a spring-biased pin assembly. The hub may be connected to the bracket via a set screw.

An adjustable bracket is disclosed. The adjustable bracket may include a first bracket portion including a first leg and a first bar element, a second bracket portion including a second leg and a second bar element, and a hub assembly supported on at least one of the first and second bracket portions. The hub assembly can be configured to engage a flexible hose component to the adjustable bracket. The first bar element can be telescopically received by the second bar element so that a distance between the first and second legs is selectively adjustable. The first and second bar elements may be fixable together at one of a plurality of predetermined locations such that the adjustable bracket assumes a predetermined length.

A method of installing an adjustable bracket to a ceiling frame is disclosed. The method may include providing a first bracket portion including a first leg and a first bar element, providing a second bracket portion including a second leg and a second bar element, the second bar element being telescopically receivable by the first bar element so that a distance between the first and second legs is selectively adjustable, providing a hub assembly supported on at least one of the first and second bracket portions, the hub assembly for coupling a flexible hose to the adjustable bracket, wherein the first and second legs each have a proximal end coupled to respective first and second bar elements and a distal element having a structure engaging portion, the structure engaging portions of the first and second legs each having a centerline that is offset from a centerline of their respective proximal ends such that the centerlines of the structure engaging portions are aligned with an opening in the hub assembly; adjusting a distance between the first and second legs by sliding the first and second bar elements with respect to each other, and engaging the structure engaging portions of the first and second legs to ceiling structural elements.

BRIEF DESCRIPTION OF THE DRAWINGS

The accompanying drawings illustrate preferred embodiments of the disclosed device so far devised for the practical application of the principles thereof, and in which:

FIG. 1A is an isometric view of an embodiment of the disclosed flexible hose support bracket;

FIG. 8 is an isometric view of the hub assembly of FIG. 6 in the open position;

FIGS. 9A and 9B are isometric views of a further embodiment of the disclosed flexible hose support bracket;

FIG. 32 is an isometric view of an exemplary flexible hose support bracket, with flexible hose and sprinkler head, positioned within a suspended ceiling structure.

DESCRIPTION OF EMBODIMENTS

Figure 1B:
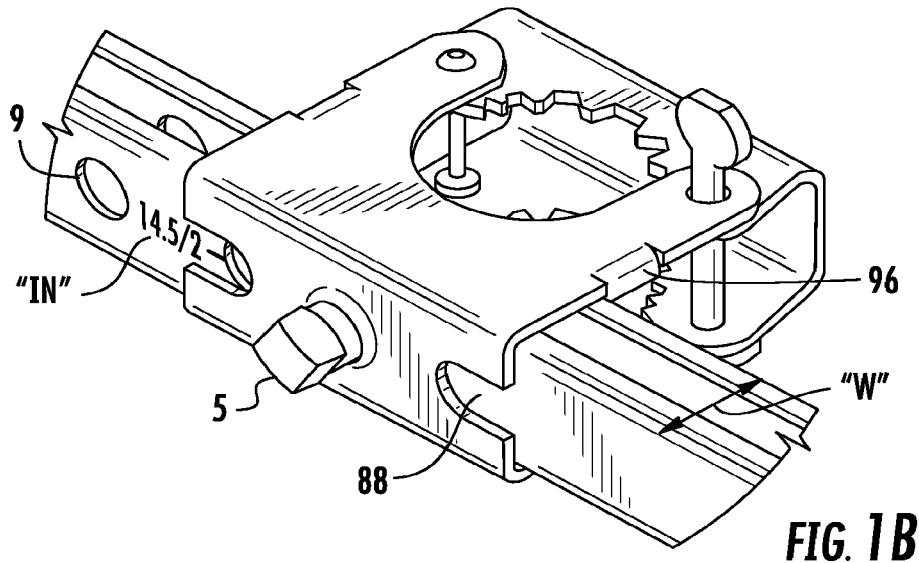
FIGS. 1B-1D are details views of portions of the flexible hose support bracket of FIG. 1.
Figure 1C:
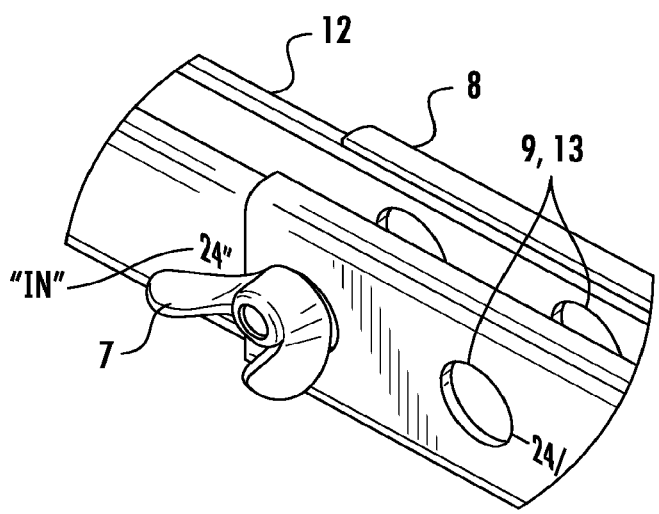
Figure 1D:
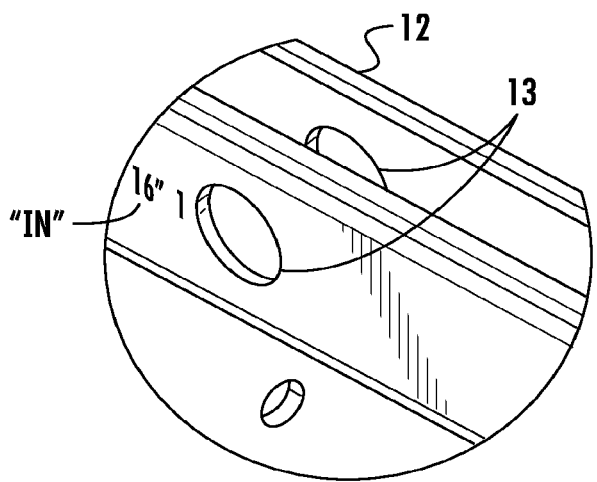
Figure 2:
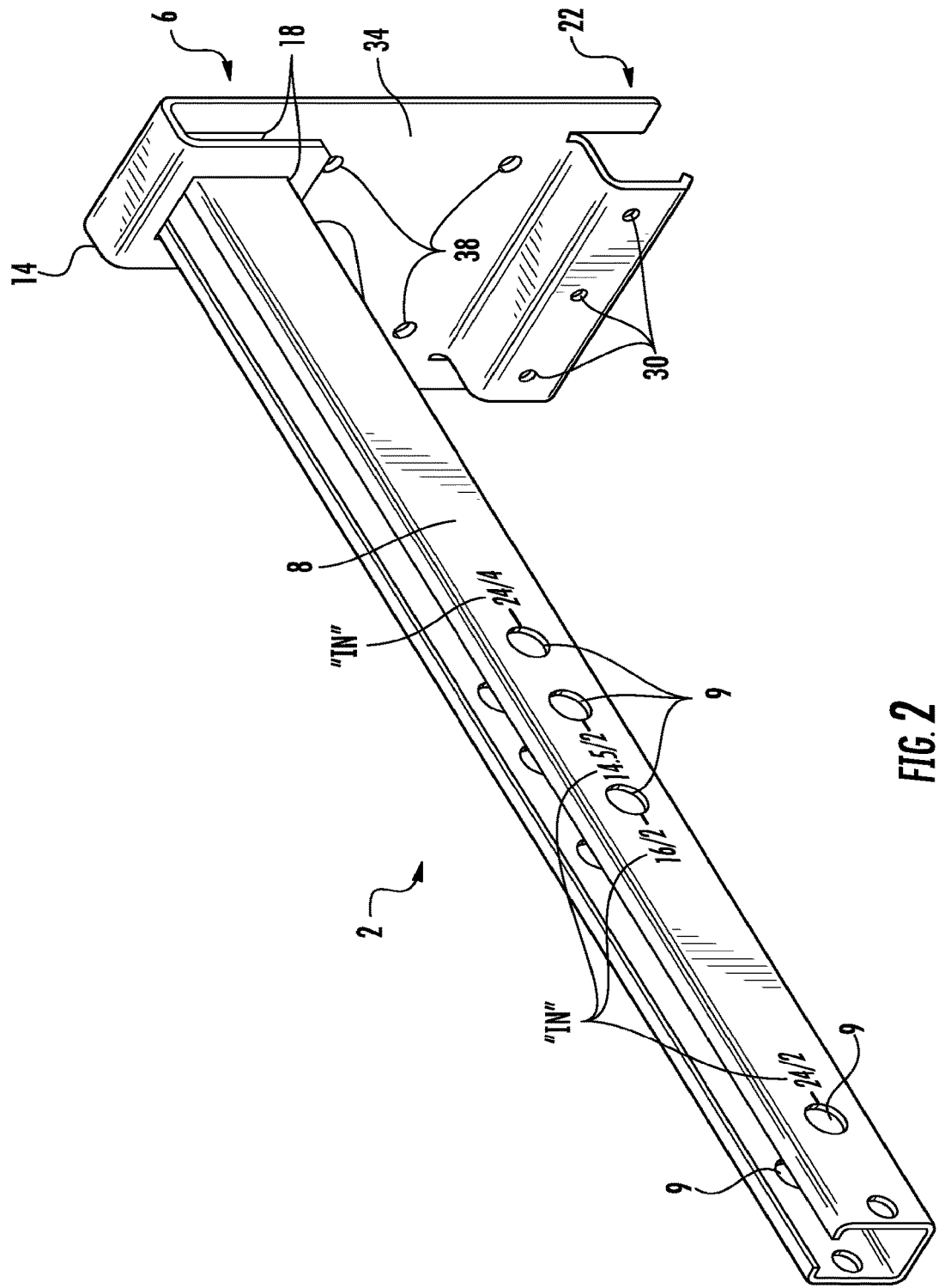
FIG. 2 is an isometric view of a first bracket portion of the flexible hose support bracket of FIG. 1.
Figure 3:
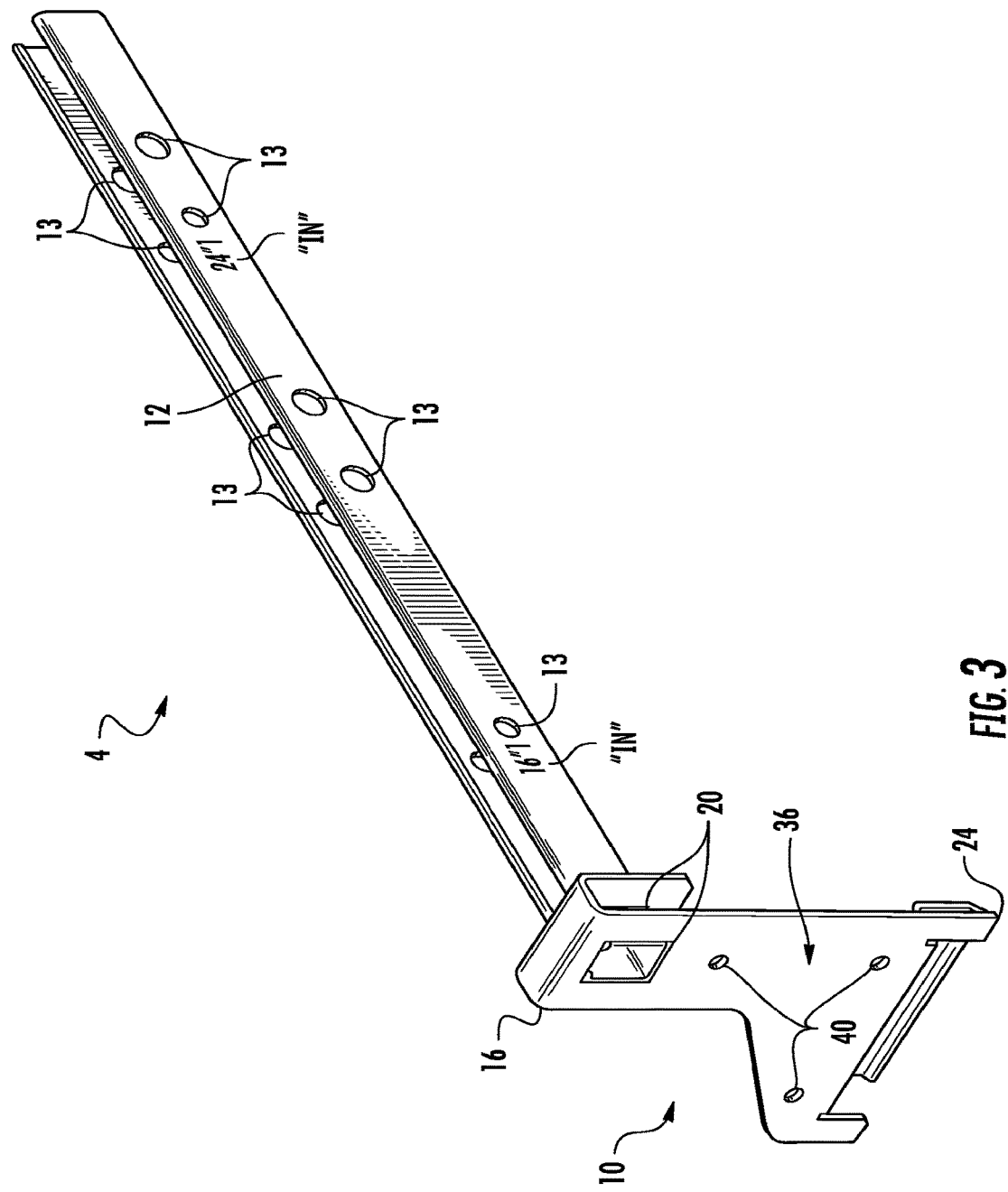
FIG. 3 is an isometric view of a second bracket portion of the flexible hose support bracket of FIG. 1.

Referring to FIGS. 1A-1D, 2 and 3, the flexible hose support bracket assembly 1 may include first and second bracket portions 2, 4 that are telescopically adjustable with respect to each other to enable the bracket assembly 1 to be adjusted to fit a variety of ceiling structure spacings. The first bracket portion 2 may include a first leg 6 and a first bar element 8, while the second bracket portion 4 may include a second leg 10 and a second bar element 12. A hub assembly 3 may be supported on the first and/or second bar element 8, 12, and may be fixed in place along the bar elements via a set screw 5. The hub assembly 3 may be used to secure a sprinkler head fitting (not shown in this view) to the flexible hose support bracket assembly 1.

The first and second legs 6, 10 of the flexible hose support bracket assembly 1 may be coupled at respective proximal ends 14, 16 to the first and second bar elements 8, 12, respectively. In the illustrated embodiment the first and second bar elements 8, 12 are received in openings 18, 20 formed in the proximal ends 14, 16 of the first and second legs 6, 10. As further illustrated, the proximal ends 14, 16 of the first and second legs 6, 10 are folded over to assume a U-shape such that the legs 6, 10 engage their respective bar elements 8, 12 at two spaced-apart locations, thus enhancing stability of the connection between the legs and bars. The first and second bar elements 8, 12 may be fixed to the first and second legs 6, 10 via any appropriate connection technique, a non-limiting example of which is welding.

The first and second bar elements 8, 12 may be of a similar geometric shape, and may be sized relative to each other so that one of the bar elements is receivable within the other bar element in a telescoping fashion. In the illustrated embodiment the first and second bar elements 8, 12 are channel members, and the channel of the first bar element 8 is sized to receive the second bar element 12 therein so that the first and second bracket portions 2, 4 are telescopically movable with respect to each other along an axis A-A of the flexible hose support bracket assembly 1. In this manner, the overall lateral dimension "L" of the support bracket assembly 1 can be adjusted to suit a particular installation configuration. It will be appreciated that although the first and second bar elements 8, 12 are shown as being channel members, that the bar elements can be any of a variety of other shapes as long as the bar elements permit adjustment of the lateral dimension "L" of the support bracket assembly 1.

As can be seen, the first and second bar elements 8, 12 each has a plurality of transversely oriented openings 9, 13. These openings 9, 13 are positioned to receive a fastener 7 therethrough to lock the first and second bar elements 8, 12 together once the lateral dimension "L" of the support bracket assembly 1 has been adjusted to a desired value. In the illustrated embodiment, the fastener 7 is a screw/wingnut combination, though it will be appreciated that any of a variety of other removable or non-removable fastener types can also be used. It will also be appreciated that more than one fastener 7 can be used to lock the first and second bar elements 8, 12 together.

The spacings between the openings enable the bracket to be adjusted to standard ceiling spacings (24", 16", and 14.5" for studs). As can be seen best in FIGS. 2 and 3, the first and second bar elements 8, 12 may have stamped or printed indicia "IN" adjacent to the transversely oriented openings 9, 13. These indicia "IN" may provide the user with predetermined combinations of openings 9, 13 that may be aligned to correspond to standard ceiling spacings. In the illustrated embodiment, the indicia "IN" are specific spacing designators, including 24", 16" 14.5", but this is not limiting, and other indicia can be used. It will be appreciated that for each specific ceiling spacing, the hub assembly 3 can be moved ¼ of the distance to either side of the middle.

The first and second legs 6, 10 may have distal ends 22, 24 configured to engage respective ceiling structural elements. In the illustrated embodiment the distal ends 22, 24 each having an elongated inverted U-shape for engaging respective T-bar beams (not shown) of a drop-ceiling support structure. The distal ends 22, 24 may each have at least one fastener 26, 28 (26 not being viewable in this figure) received in respective openings 30, 32 in the distal ends. The fasteners 26, 28 may be used to positively fix the distal ends 22, 24 to the associated ceiling support structure members. The fasteners can be of any appropriate type, a non-limiting example of which is a self-tapping screw. The fasteners 26, 28 can be pre-installed in the openings 30, 32 to make it easier for the user to fix the first and second legs 6, 10 to the ceiling structure.

As can be seen, the first and second legs 6, 10 each have a central portion 34, 36 disposed between the distal and proximal ends. These central portions 34, 36 may also include a plurality of openings 38, 40 configured to receive fasteners such as screws for fixing the first and second legs 6, 10 to ceiling studs (not shown), where such an installation is desired or necessary.

Figure 4:
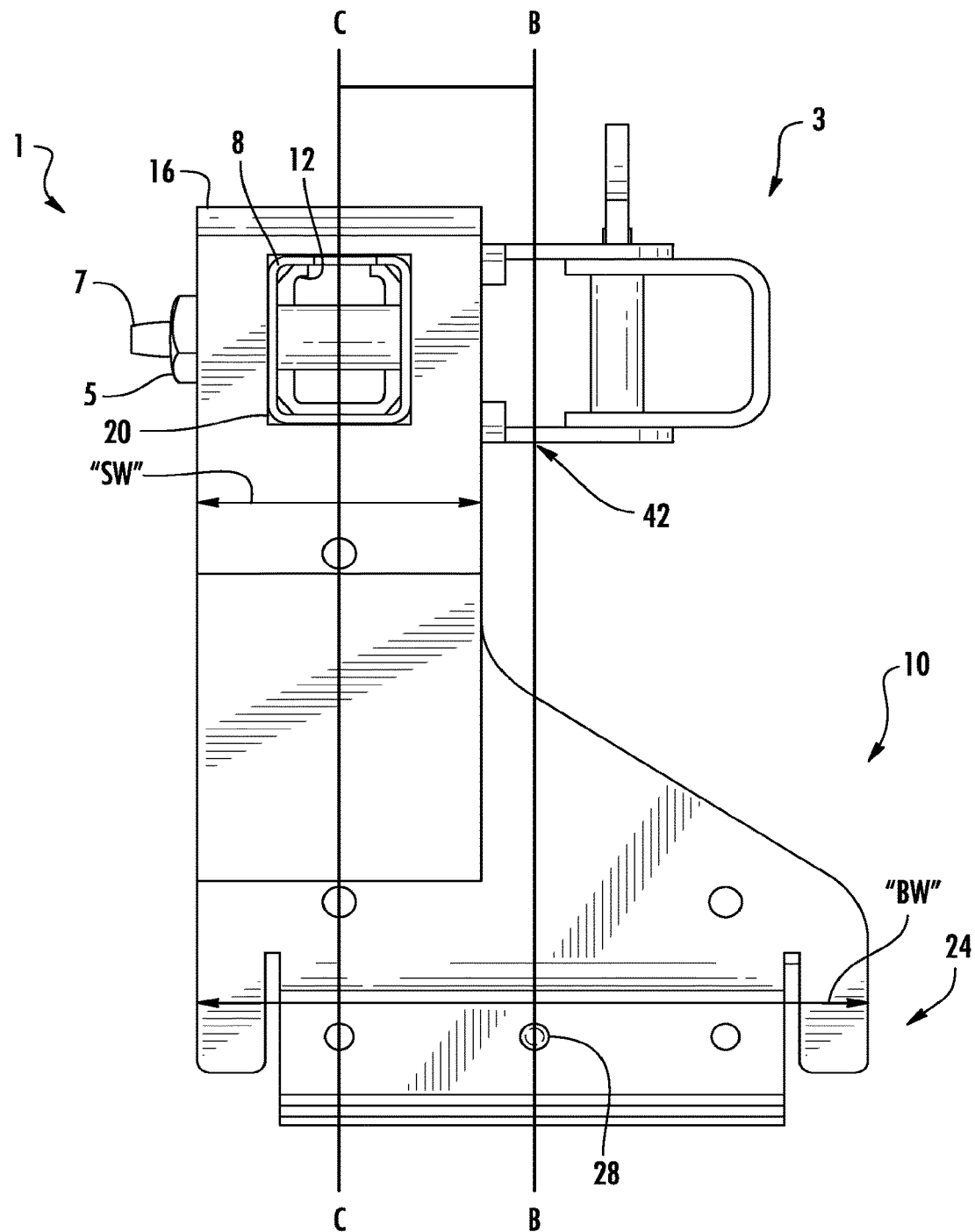
FIG. 4 is a side view of the flexible hose support bracket of FIG. 1.
Figure 5:
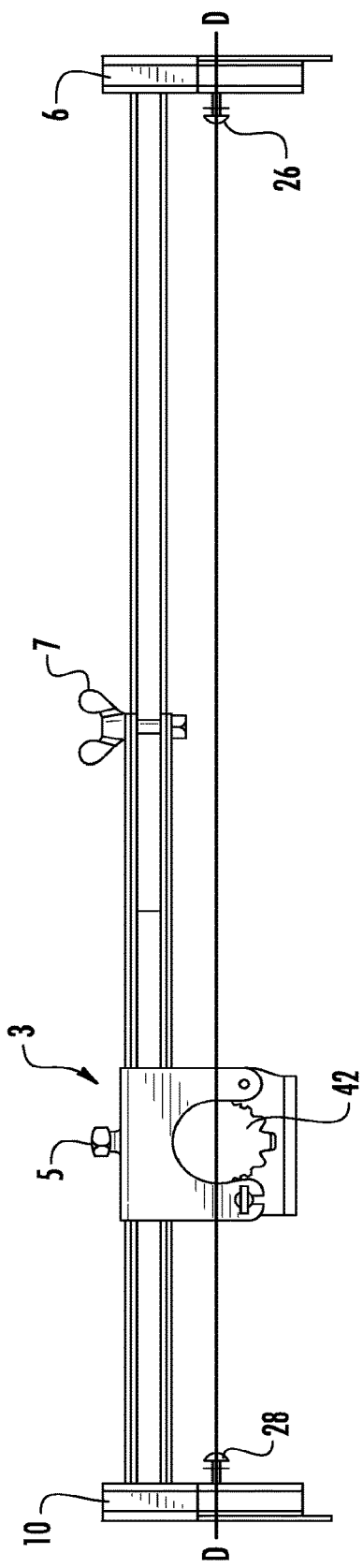
FIG. 5 is a top plan view of the flexible hose support bracket of FIG. 1.

Referring to FIG. 4, a side view of the disclosed flexible hose support bracket assembly 1 is shown. Although only the second leg 10 is shown, it will be appreciated that the same features will apply to the first leg 6. The distal end 24 has a first width "FW" and the proximal end 16 has a second width "SW," where SW<FW. The second leg 10 has a first centerline B-B at the distal end 24, and a second centerline C-C at the proximal end 16. As can be seen, the first and second centerlines B-B and C-C are offset with respect to each other by an offset distance "OD." The openings 20 in the proximal end of the second leg 10 are centered on the second centerline C-C to center the first and second bar elements 8, 12 on the second centerline. The fastener 28 disposed in the distal end 24 of the second leg 10 is centered on the first centerline B-B. The offset distance "OD" can be selected so that the first centerline B-B intersects the hub opening 42 in the hub assembly 3, thus aligning the hub opening with the centerline of the distal end 24 of the second leg 10 as well as with the fastener 28 disposed in the distal end. This can also be seen in FIG. 5, which shows the fasteners 26, 28 aligned with the hub opening 42 in the hub assembly 3 along axis D-D.

During installation, a user can align the fasteners 26, 28 with appropriate markings on the ceiling frame, and the hub opening 42 (and thus the sprinkler head) can thus be automatically aligned with the center of the ceiling tile without further adjustment. In addition, aligning the fasteners 26, 28 with the hub opening 42 minimizes or eliminates twisting force on the fasteners 26, 28 during installation.

Figure 6:
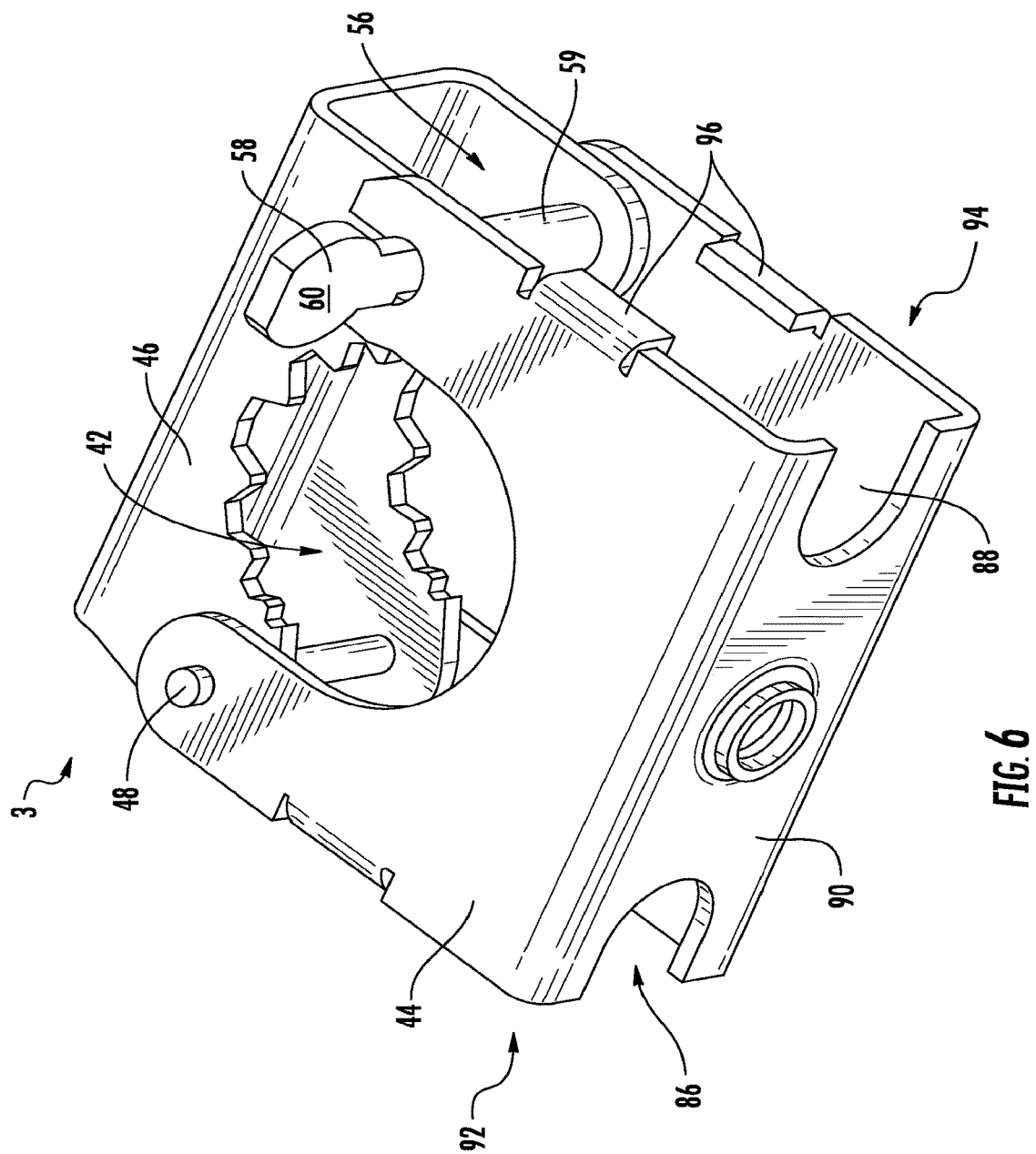
FIG. 6 is an isometric view of a hub assembly of the flexible hose support bracket of FIG. 1.
Figure 7A:
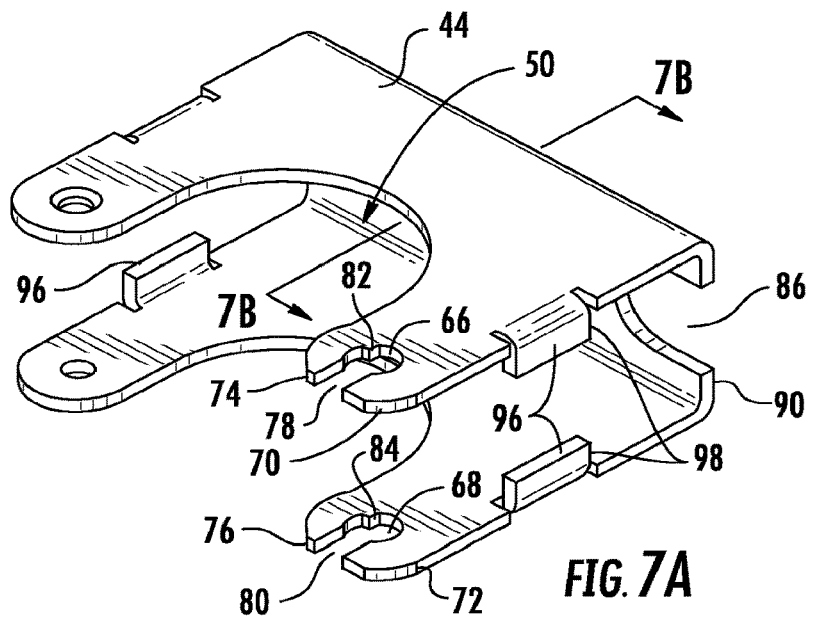
FIG. 7A is an isometric view of a primary support portion of the hub assembly of FIG. 6.
Figure 7B:
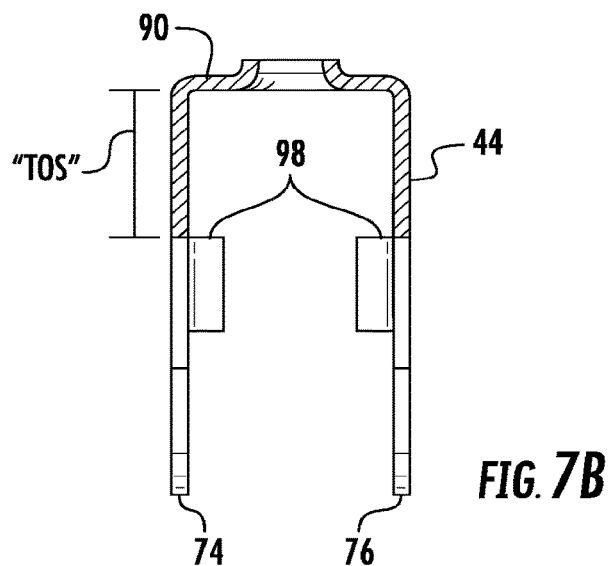
FIG. 7B is a cross-section view, taken along line 7B-7B of FIG. 7A.
Figure 7C:
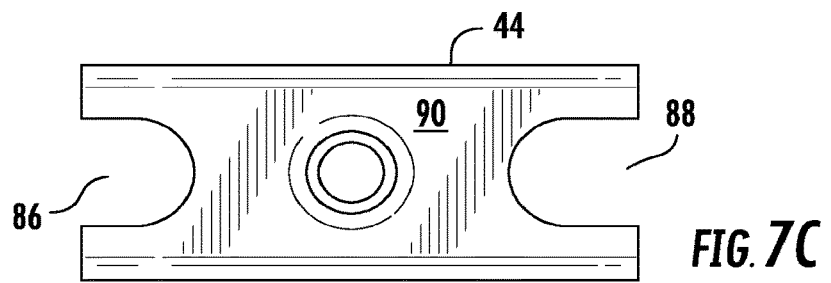
FIG. 7C is a rear view of the primary support portion of the hub assembly of FIG. 6.
Figure 7D:
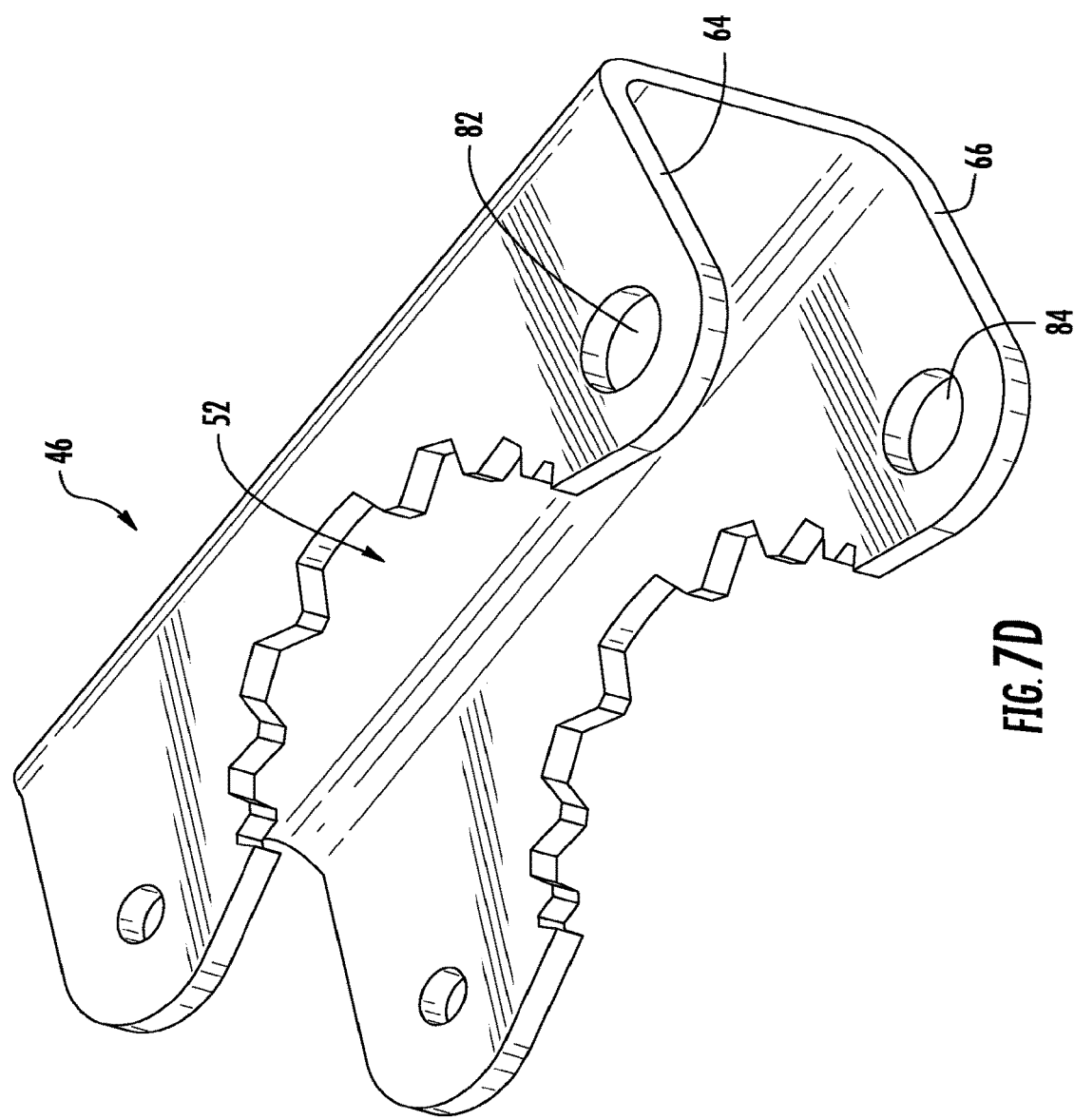
FIG. 7D is an isometric view of a secondary support portion of the hub assembly of FIG. 6.
Figure 7E:
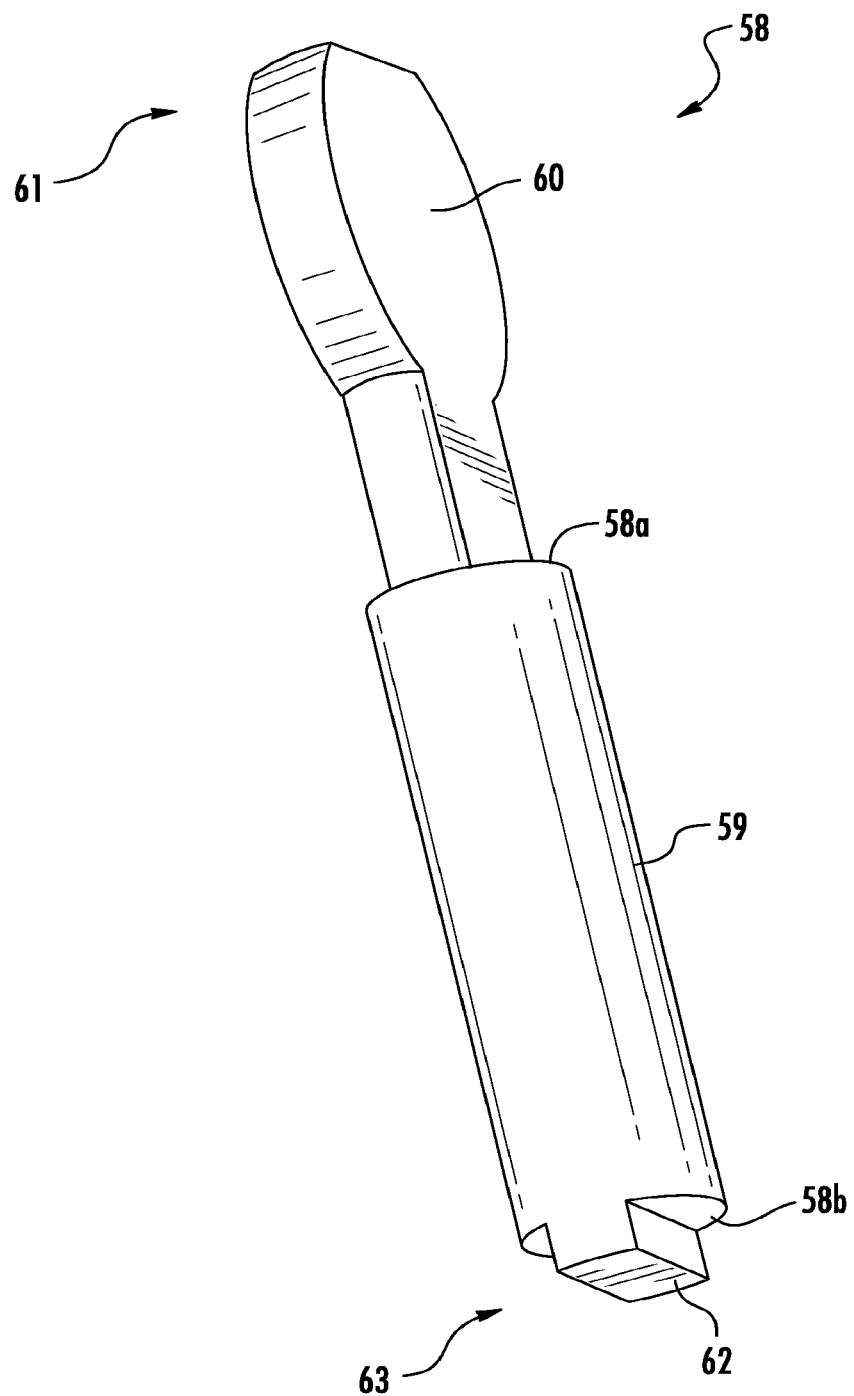
FIG. 7E is an isometric view of a locking pin portion of the hub assembly of FIG. 6.

FIGS. 6-7E show the hub assembly 3, which as previously noted can be used to secure a sprinkler head fitting (not shown) to the flexible hose support bracket assembly 1. The hub assembly 3 includes a primary support 44 which mounts on the first and/or second bar element 8, 12, and a secondary support 46 that is rotatably connected to the primary support 44 via a captured pin 48. The secondary support 46 rotates relative to the primary support 44 about the pin 48 between a closed position (shown) and an open position (see FIG. 8). The primary support 44 and secondary support 46 are each formed having cut out portions 50, 52 so that when the secondary support 46 is in the closed position relative to the primary support 44, the cut out 50 formed in the primary support cooperates with the cut out 52 formed in the secondary support 46 to define a hub opening 42 configured to receive and securely retain the sprinkler head fitting (not shown).

The hub assembly 3 includes a locking mechanism 56 that selectively connects locks the primary support 44 and the secondary support 46 in the closed position. In the illustrated embodiment the locking mechanism 56 comprises a locking pin 58 that is carried by the secondary support 46, and is configured to engage with features of the primary support 44 to lock the primary and secondary supports in place with respect to each other. Specifically, locking pin 58 is rotatably held within first and second openings 82, 84 in the secondary support 56. As can be seen in FIG. 7E, the locking pin 58 has first and second shoulders 58a, 58b positioned at opposite ends of a middle portion 59, upper tab portion 60 at a first end 61 of the locking pin, and a lower tab 62 portion at a second end 63 of the locking pin. As can be seen, the upper and lower tab portions 60, 62 are generally rectangular in cross-section, and have a first cross-sectional dimension that is smaller than the diameter of the middle portion 59, and a second cross-sectional dimension that is the same as the diameter of the middle portion. The middle portion 59 can be captured between the upper and lower plate portions 64, 66 of the secondary support 46 such that the upper tab portion 60 extends through the first opening 82 above the upper plate portion and the lower tab portion 62 extends through the second opening 84 below the lower plate portion. In this way the locking pin 58 is captured between the upper and lower plate portions 64, 66 and so that it can be freely rotated about its axis with respect to the secondary support 46.

As can be seen in FIG. 7A, each of the first and second openings 66, 68 of the primary support 44 is a generally circular opening disposed adjacent to and spaced apart from a corresponding free edge 74, 76 of the upper and lower plate portions 70, 72 of the primary support 44. A slot 78, 80 extends between each opening 66, 68 and the corresponding free edge 74, 76 of the primary support. Each slot 78, 80 is open along the corresponding free edge 74, 76, and has a slot dimension parallel to the corresponding free edge that is less than the catch opening dimension parallel to the corresponding free edge. Each slot 78, 80 thus provides a passage through which the upper and lower tab portions 60, 62 of the locking pin 58 (when oriented such that their first (smaller) cross-section is aligned with the slots) can pass into the respective openings 66. 68 of the primary support 44 as the secondary support 46 rotates to the closed position.

Once the upper and lower tab portions 60, 62 of the locking pin 58 are received within the respective openings 66, 68 of the primary support 44, the locking pin 58 may be rotated about its axis so that the second (larger) cross-section of the upper and lower tab portions 60, 62 is aligned with the slots 78, 80. Since the larger cross-section of the upper and lower tab portions 60, 62 is larger than the slot dimension parallel to the free edge 74, 76 of the primary support 44, the locking pin cannot pass back through the slots 78, 80 and thus the secondary support 46 is locked to the primary support 44.

Each of openings 66, 68 of the primary support 44 may also include a radially inwardly projecting protrusion 82, 84 that serves as a stop element for the upper and lower tab portions 60, 62. This protrusion can be positioned such that the locking pin 58 can be easily and verifiably rotated by no more than 90-degrees once the locking pin 58 is engaged with the openings 66, 68 of the primary support 44. That is, when the locking pin 58 is inserted into the openings 66, 68, it can then be rotated about its axis until the upper and lower tab portions 60, 62 engage the respective protrusions 82, 84. Further rotation in that direction is thus prevented. As will be appreciated, thus prevents over-rotation of the locking pin 58 by the user.

The primary and secondary support 44, 46 can be disconnected by reversing this operation. The primary support 44 can include first and second lateral recesses 86, 88 disposed on a side plate portion 90 of the primary support. These first and second lateral recesses 86, 88 may open outward toward first and second sides 92, 94 of the primary support 44. As can be best seen in FIG. 8, the first and second lateral recesses 86, 88 may be sized to enable the hub assembly 3 to overlap the fastener 7 to provide for a wider range of locational positioning of the hub assembly 3 along the first and second bar elements.

Referring again to FIGS. 6 and 7A-7C, the hub assembly 3 may include a plurality of depending tabs 96 formed in the primary support 44. These depending tabs 96 may be positioned to that side edges 98 of the tabs are offset from the side plate portion 90 of the primary support 44 by a tab offset distance "TOS" (FIG. 7B). In some embodiments this tab offset distance "TOS" is slightly larger than a width "W" of the first bar element 8 (FIG. 1B). Thus arranged, the depending tabs 96 serve to rotationally lock the hub assembly 3 to the first and second bar elements 8, 12 so that the hub assembly will not rotate about a longitudinal axis of a connected flexible hose (FIGS. 32 and 33) during operation.

FIG. 8 shows the hub assembly 3 locked into position on the first and second bar elements 8, 12 by set screw 5. The hub assembly 3 is in the open configuration, ready for installation of a sprinkler head fitting. As can be seen, the hub assembly 3 is positioned directly adjacent to the fastener 7, with the fastener received in the first lateral recess 86 of the primary support 44. In addition, the depending lateral tabs 96 are shown abutting a side surface of the first bar element 8, to which the hub assembly 3 is attached.

Referring now to FIGS. 9A-18, a further embodiment of a flexible hose support bracket assembly 100 will be described. The flexible hose support bracket assembly 100 of this embodiment includes first and second bracket portions 102, 104 that include any or all of the features as the first and second bracket portions 2, 4 previously described in relation to FIGS. 1A-3, and thus those features will not be repeated.

The hub assembly 103 can be received on the first and/or second bar elements 108, 112 in a manner similar to that described in relation to hub assembly 3, with the exception that a set screw is not used with the hub assembly of FIG. 9A. Rather, the hub assembly 103 is locked to the first and/or second bar elements 108, 112 when the primary and secondary supports 144, 146 are configured in the closed position (as shown in FIG. 9A). In addition, the hub assembly 103 may have an opening 142 that is sized and shaped to receive a plurality of flat surfaces 200 of a sprinkler drop nipple 202.

Figure 10:
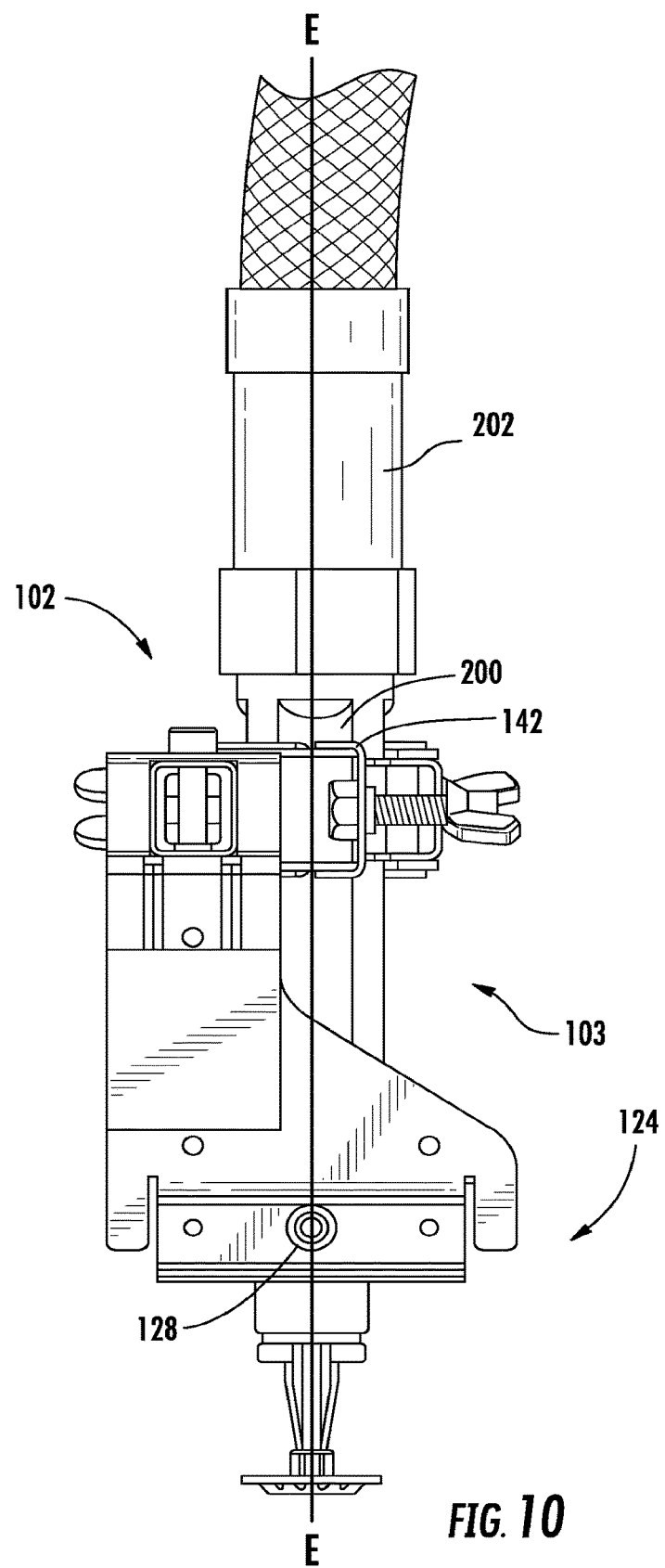
FIG. 10 is a side view of the flexible hose support bracket of FIG. 9A.
Figure 11:
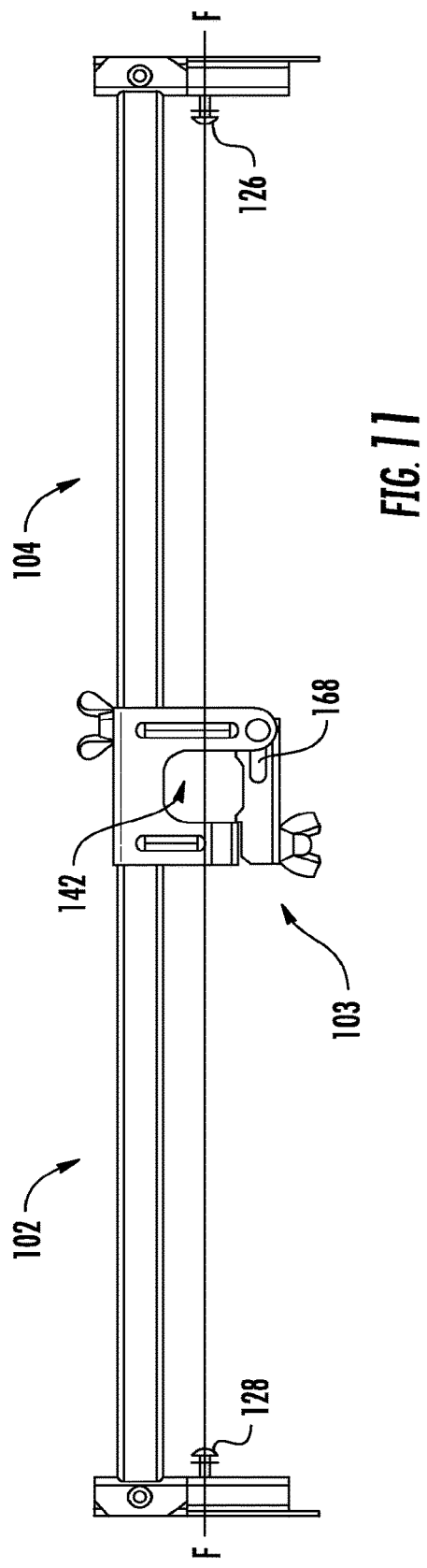
FIG. 11 is a top plan view of the flexible hose support bracket of FIG. 9A.

As can be seen in FIG. 10, the flexible hose support bracket assembly 100 may be configured so that a fastener 128 disposed in a distal end 124 of a second leg 110 is centered on a centerline E-E of the hub opening 142 in the hub assembly 103, thus aligning the hub opening and the sprinkler drop nipple 202 with the centerline of the distal end 124 of the second leg 110 as well as with the fastener 128 disposed in the distal end. This can also be seen in FIG. 11, which shows the fasteners 26, 28 aligned with the hub opening 142 in the hub assembly 3 along axis F-F.

Figure 12:
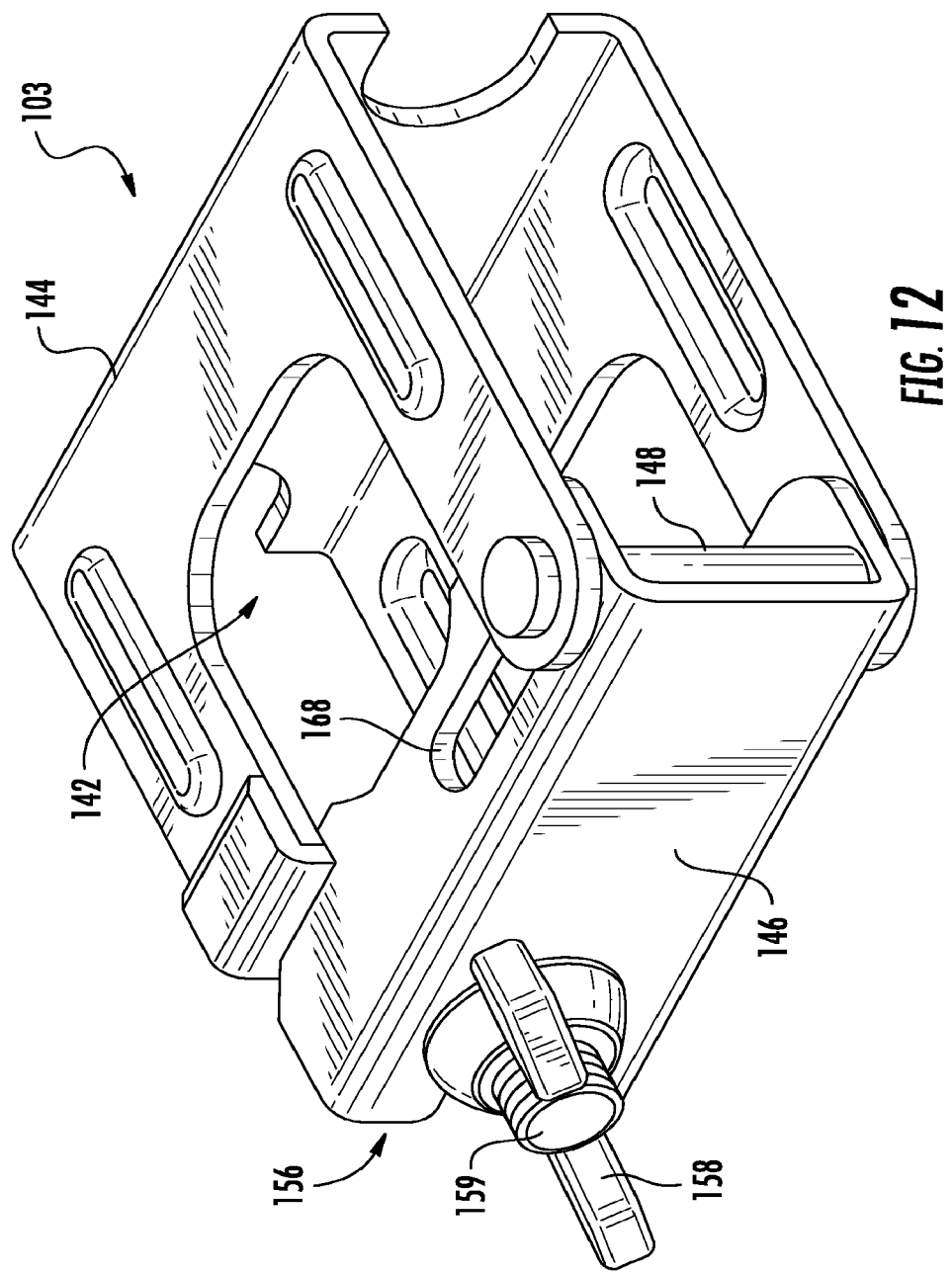
FIG. 12 is an isometric view of a further embodiment of a hub assembly of the flexible hose support bracket of FIG. 9A.

Referring now to FIG. 12, the hub assembly 103 may comprising primary and secondary supports 144, 146 that are rotatably coupled to each other via a captured pin 148. The secondary support 146 rotates relative to the primary support 144 about the pin 148 between a closed position (shown) and an open position (see FIG. 16). The primary support 144 and secondary support 146 are each formed having cut out portions 150, 152 (FIGS. 13 and 14) so that when the secondary support 146 is in the closed position relative to the primary support 144, the cut out 150 formed in the primary support cooperates with the cut out 152 formed in the secondary support 146 to define a hub opening 142 configured to receive and securely retain the sprinkler drop nipple 202.

The hub assembly 3 can include a locking mechanism 156 that selectively locks the primary support 144 and the secondary support 146 in the closed position. In the illustrated embodiment the locking mechanism 156 comprises a wing nut 158 and bolt 159 combination carried by the primary support 144, and is configured to engage with features of the primary support 144 to lock the primary and secondary supports in place with respect to each other.

Figure 13:
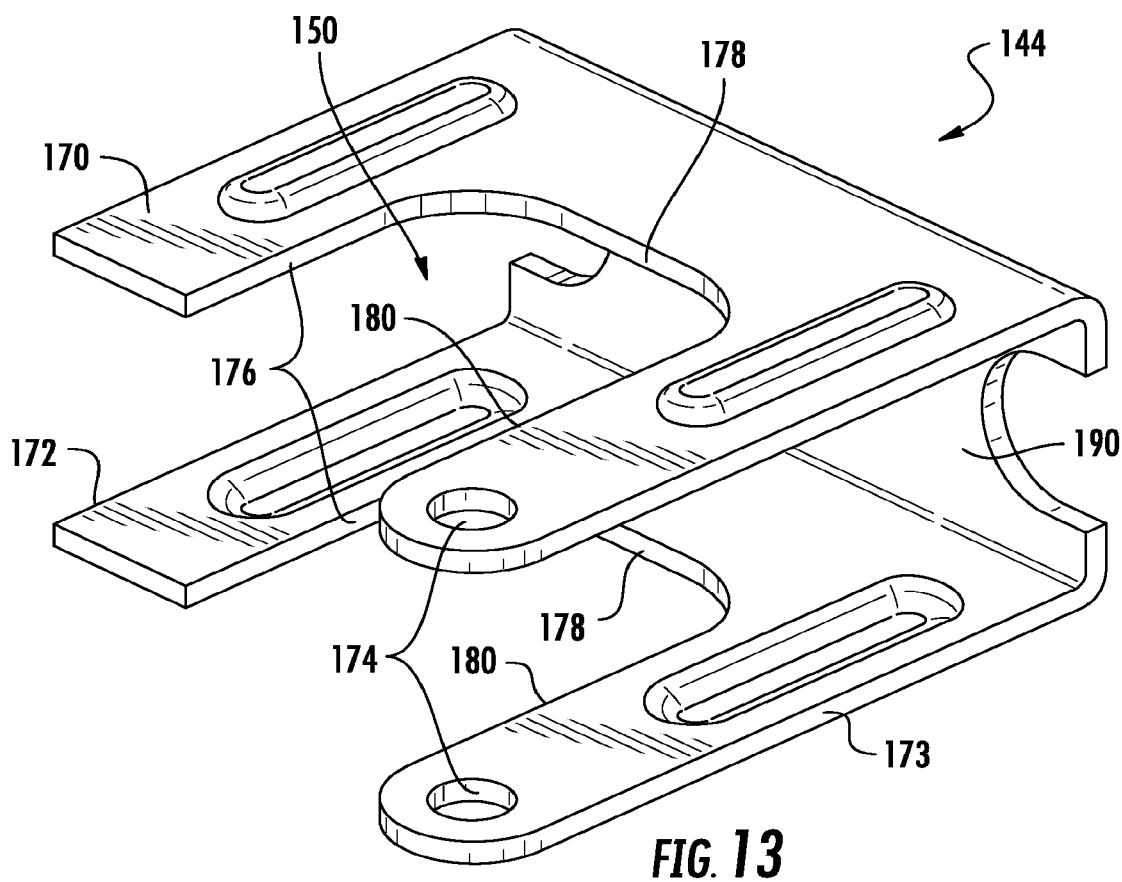
FIG. 13 is an isometric view of a primary support portion of the hub assembly of FIG. 12.

FIG. 13 shows the primary support 144, which includes an upper plate portion 170 and a lower plate portion 172 connected by a side plate portion 190. A first side 173 of the primary support 144 includes a pair of aligned openings 174 disposed in the upper and lower plate portions 170, 172. These openings 174 are configured to receive the pin 148 therethrough to rotatably couple the primary support 144 to the secondary support 146. First, second and third interior surfaces 176, 178, 180 of the upper and lower plate portions 170, 172 which define a portion of the opening 150, can be flat, and can be oriented substantially perpendicular to adjacent surfaces to provide opening 150 with a flat-sided U-shape to flatly abut corresponding flat surfaces of the sprinkler drop nipple 202.

Figure 14:
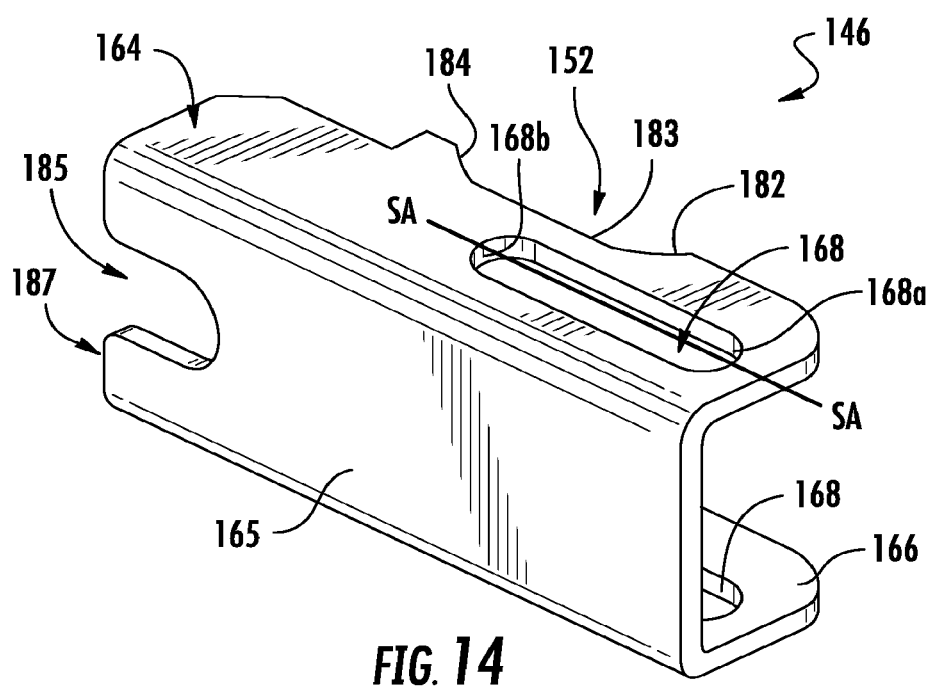
FIG. 14 is an isometric view of a secondary support portion of the hub assembly of FIG. 12.

FIG. 14 shows the secondary support 146, which includes upper and lower plate portions 164, 166 connected by a side plate portion 165. A pair of slots 168 may be disposed in the upper and lower plate portions 164, 166. These slots 168 may each have a slot axis "SA" that is substantially parallel to the plane of the side plate portion 165. The slots 168 may each have first and second ends 168a, 168b. The slots 168 may be configured to receive the pin 148 therethrough to couple to the secondary support 146 to the primary support 144. In addition to allowing pivotal motion between the primary and secondary supports 144, 146, the slots 168 allows the secondary support to move laterally along the slot axis SA, between the first and second ends 168a, 168b, with respect to the pin 148 and the primary support 144.

The opening 152 in the secondary support 146 may be formed by first, second and third interior surfaces 182, 183, 184 of the upper and lower plate portions 164, 166. The second interior surface 183 can be oriented substantially parallel to the plane of the side plate portion 165, while the first and third interior surfaces 182, 184 may be curved or angled to provide the opening 152 with a shape that engages at least one flat side to abut a corresponding flat surface of the sprinkler drop nipple 202.

The secondary support 146 may further include a lateral recess 185 formed in the side plate portion adjacent a first side 187 of the secondary support. As can be seen in FIG. 12, this lateral recess 185 is sized to receive a shank portion of the bolt 159 laterally therethrough. This arrangement eliminates the need for the bolt 159 itself to pivot to enable engagement with the secondary support.

Figure 15:
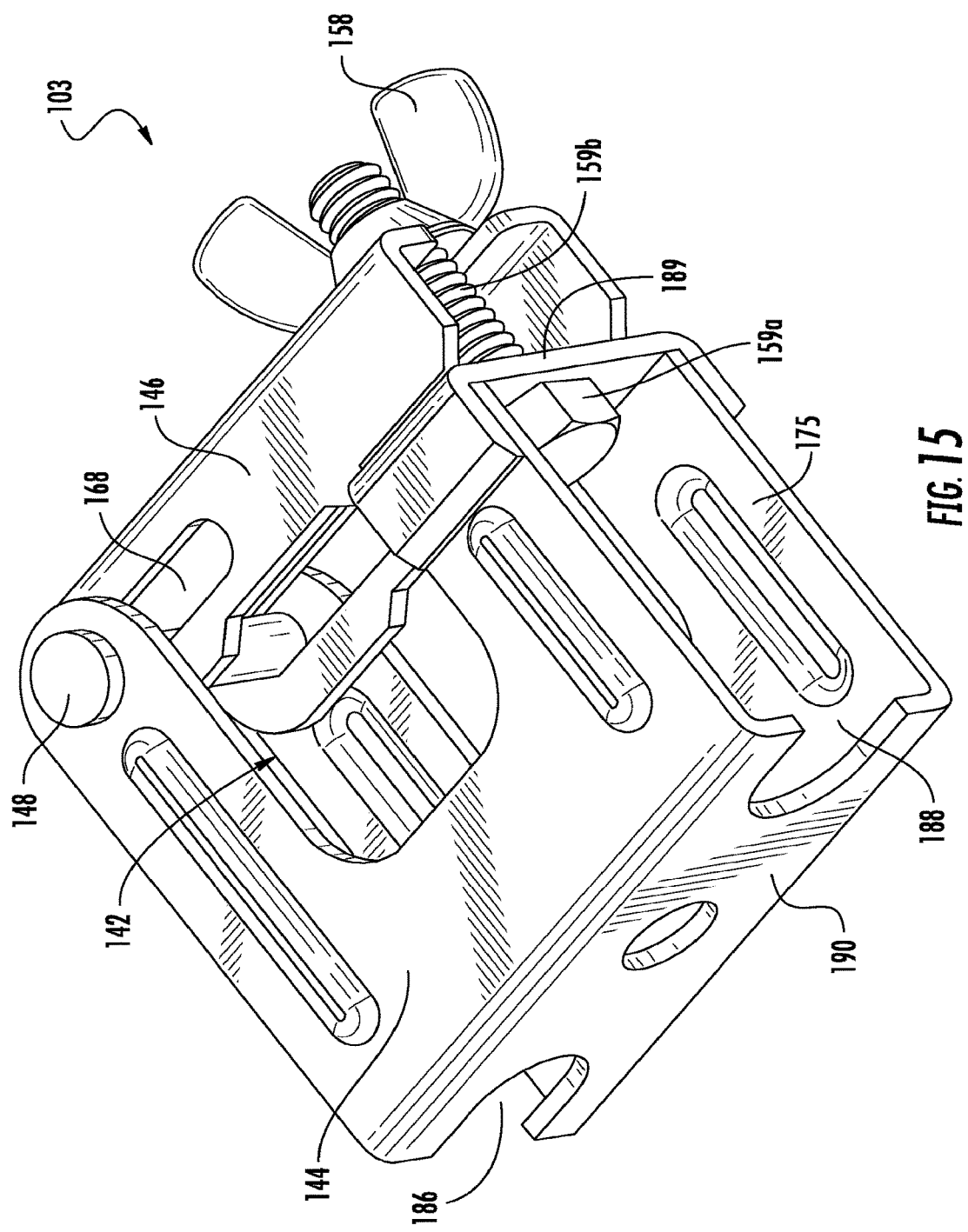
FIG. 15 is a reverse isometric view of the hub assembly of FIG. 12.

FIG. 15 shows the inter-engagement of the wing nut 158 and bolt 159 with the primary support 144. Specifically, a cross-member 189 may be positioned between the upper and lower plate portions 170, 172 of the primary support 144 on a second side 175 of the primary support. The cross-member 189 may have an opening for slidably receiving a shank portion of the bolt 159 therethrough. As can be seen, a head portion 159a of the bolt is disposed on one side of the cross-member 189, and the shank portion 159b of the bolt engages the wing nut 158. The wing nut 158 can engage the side plate portion 165 of the secondary support 146 to clamp the secondary support toward the primary support 144.

Also visible in FIG. 15 are the first and second lateral recesses 186, 188 disposed on a side plate portion 190 of the primary support 144. These first and second lateral recesses 186, 188 may open outward toward first and second sides 173, 175 of the primary support 144. As with the previously described embodiment, the first and second lateral recesses 186, 188 may be sized to enable the hub assembly 103 to overlap the fastener 107 to provide for a wider range of locational positioning of the hub assembly 103 along the first and second bar elements. In this embodiment, the fastener 107 is shown overlapping the hub assembly.

Figure 9B:
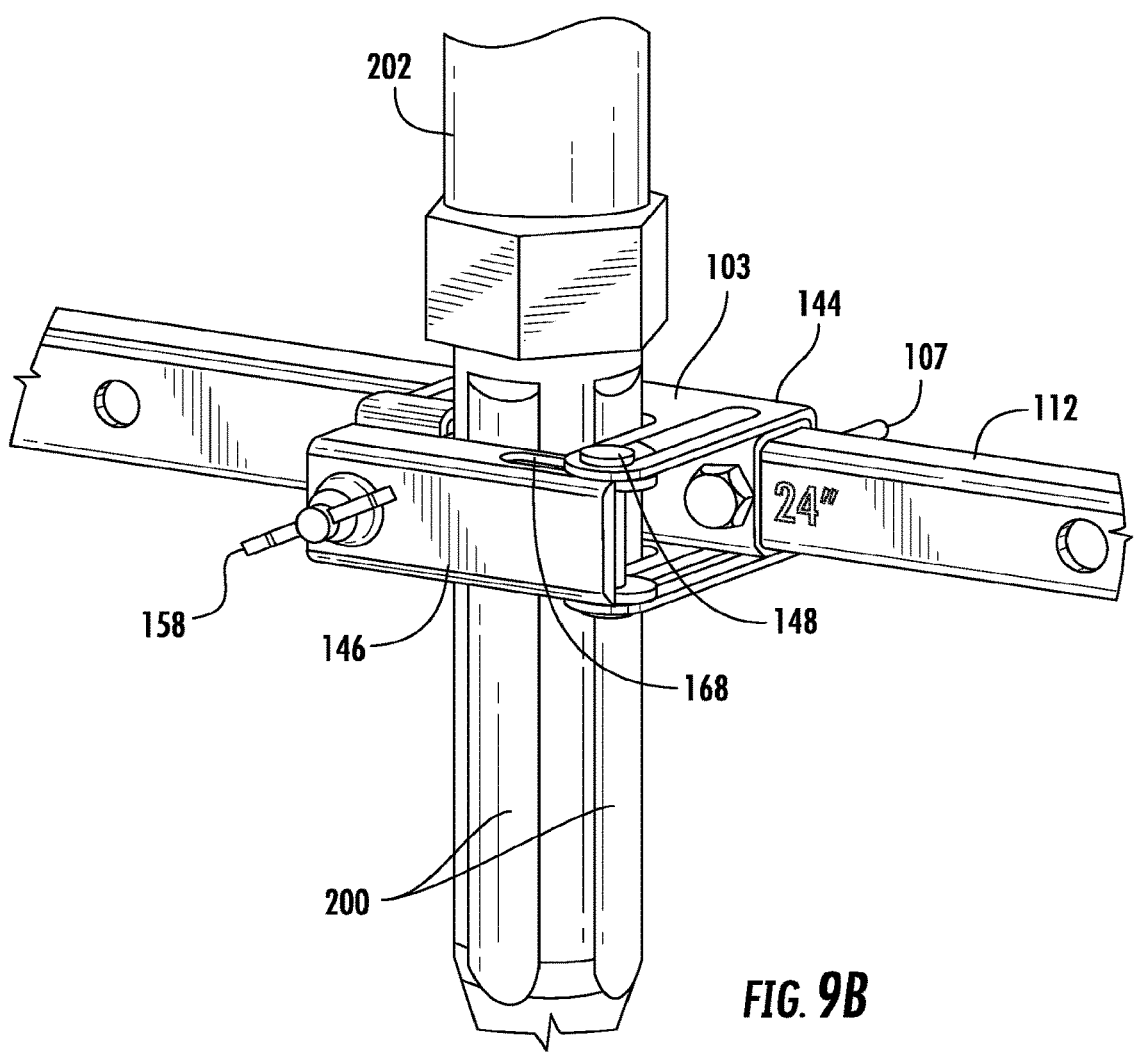
Figure 16:
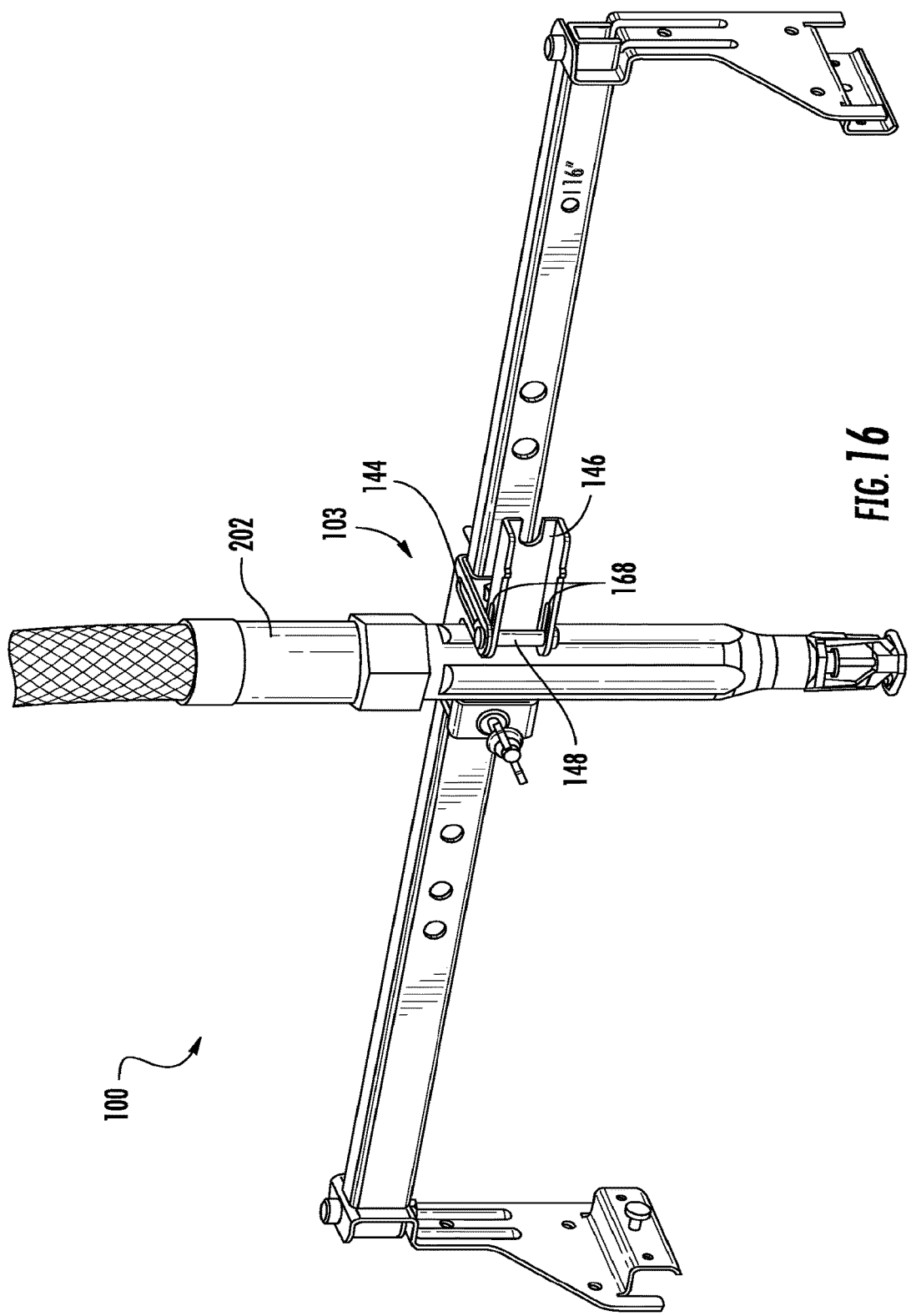
FIGS. 16-18 are isometric views of the flexible hose support bracket of FIG. 9A in various states of engagement with a flexible hose.
Figure 17:
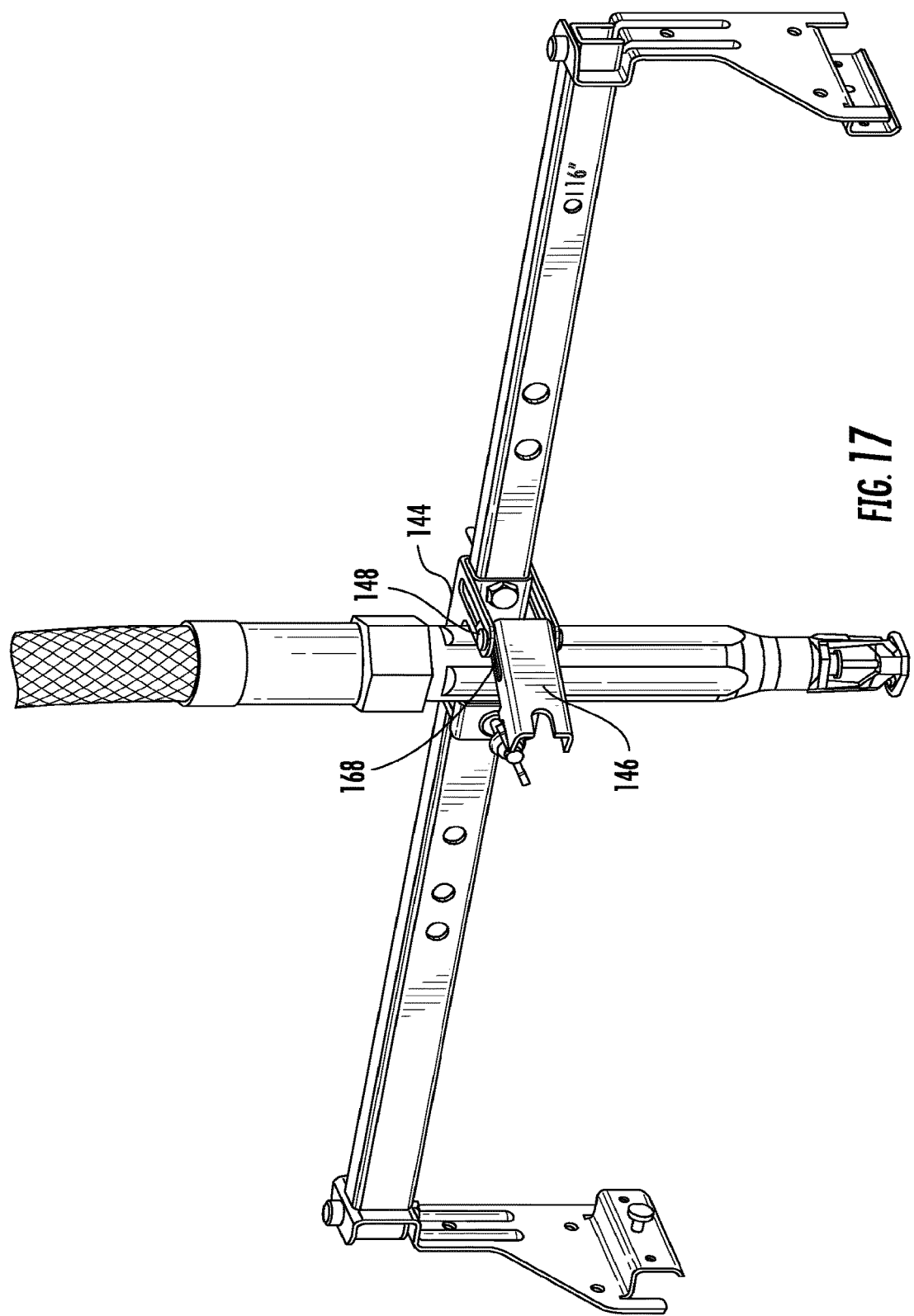
Figure 18:
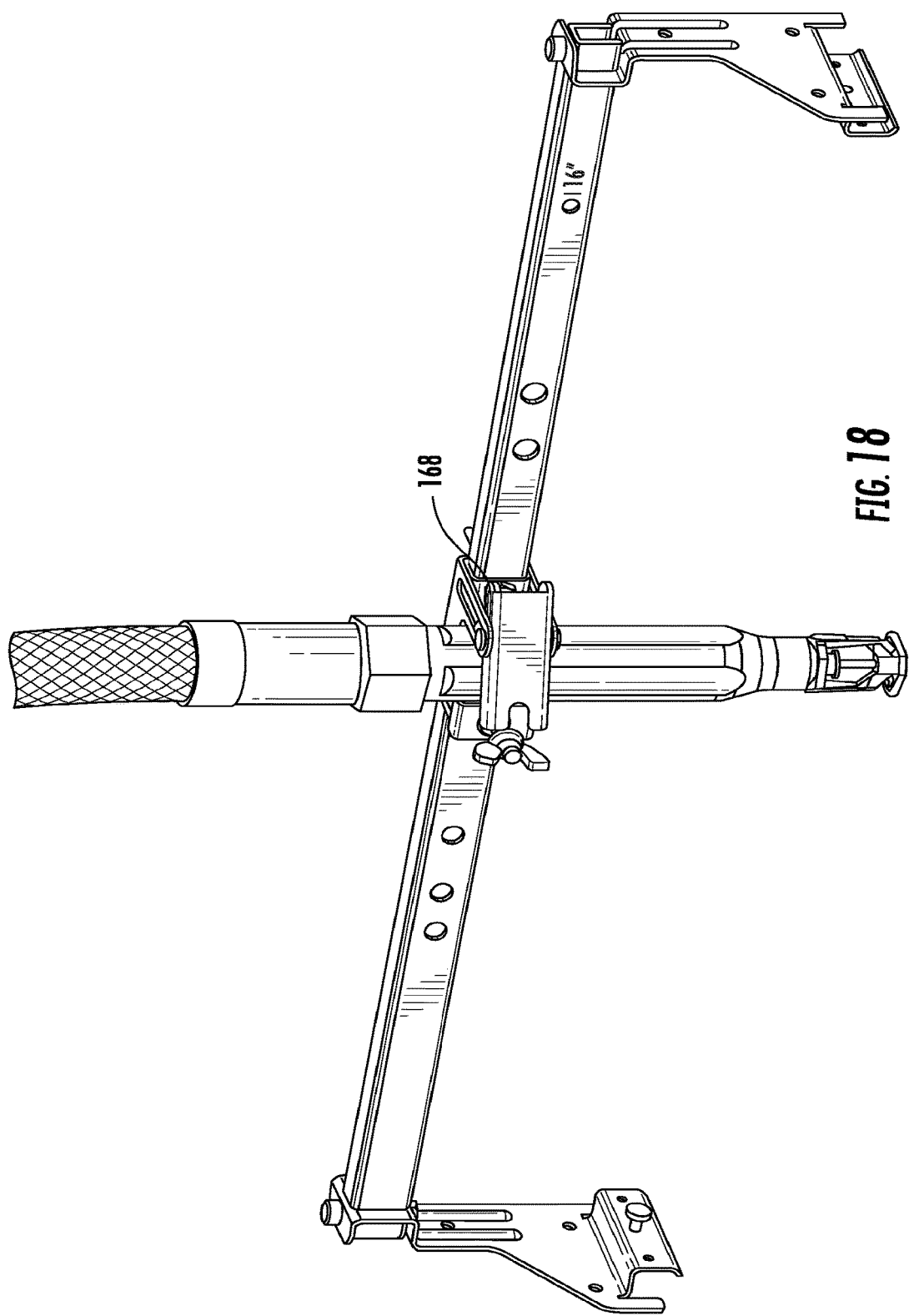

Referring now to FIGS. 16-18, a locking process for the hub assembly 103 will be described in greater detail. FIG. 16 shows the hub assembly 103 in the open configuration, with the sprinkler drop nipple 202 positioned adjacent the opening 150 of the primary support 144. The secondary support 146 is rotated away from the primary support 144 about pin 148. The pin 148 is positioned at the first end 168a of the slots 168 in the secondary support 146. FIG. 17 shows the hub assembly in the partially closed configuration, in which the secondary support 146 is rotated toward the primary support 144 about pin 148. The pin 148 remains at the first end 168a of the slots 168 in the secondary support 146. FIG. 18 shows the secondary support 146 continuing to pivot toward the primary support 144. In this view it can also be seen that the secondary support 146 has been moved laterally with respect to the primary support 144 such that the pin 148 is positioned at the second end 168b of the slots 168 of the secondary support. FIGS. 9A and 9B show the hub assembly 103 in the closed configuration in which the pin 148 is again positioned at the first end 168a of the slots 168 and the wing nut 158 clamps the secondary support 146 against the sprinkler drop nipple 202. In this configuration, the four flat sides of the sprinkler drop nipple 202 are engaged by the corresponding flat surfaces of the primary and secondary supports 144, 146, thus preventing the sprinkler drop nipple 202 from rotating with respect to the hub assembly 103. This configuration also clamps the hub assembly 103 and sprinkler drop nipple 202 securely to the first and/or second bar elements 108, 112, eliminating the need for a separate set screw to lock the hub assembly to the bar elements.

Figure 19:
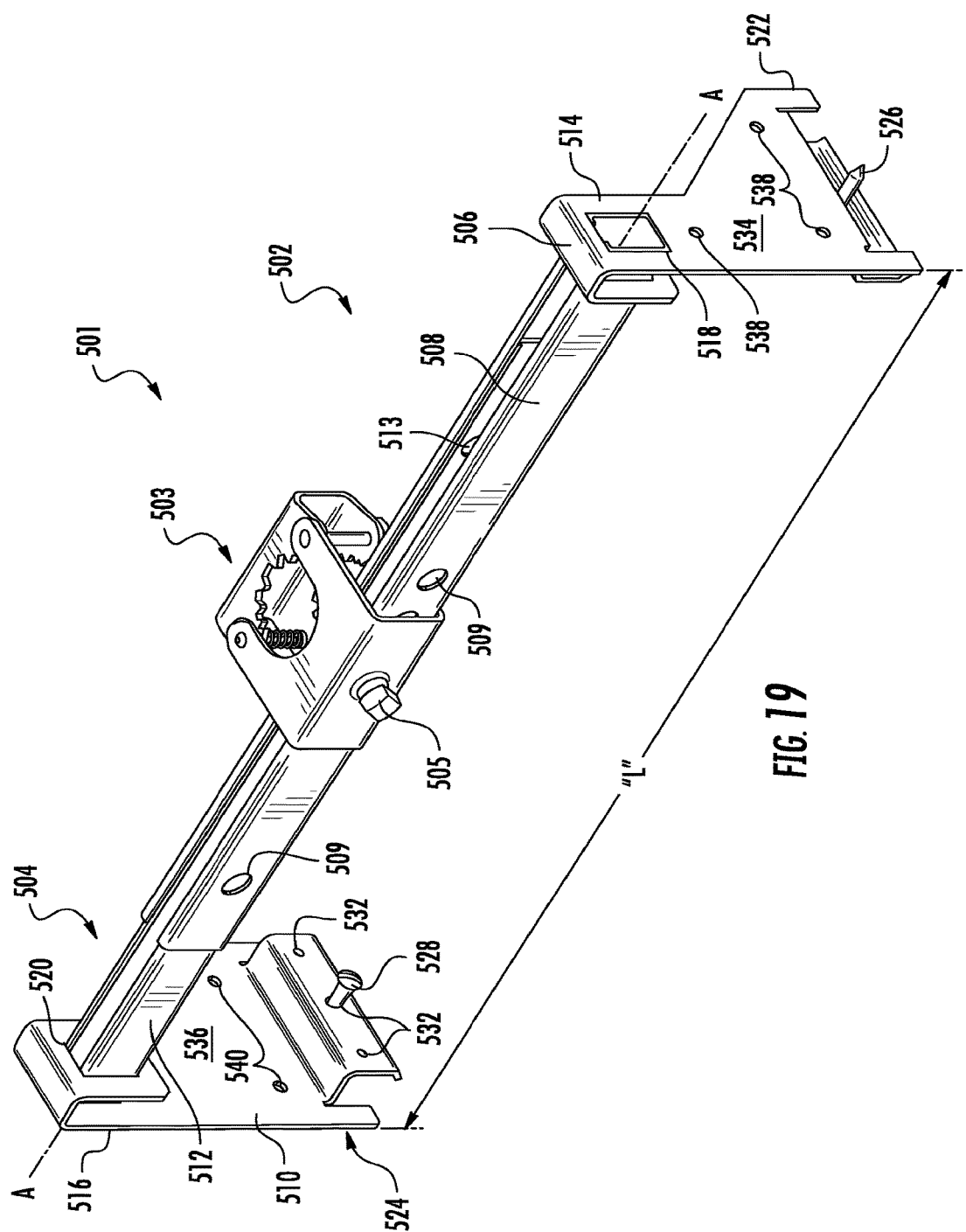
FIG. 19 is an isometric view of another embodiment of a flexible hose support bracket.
Figure 20:
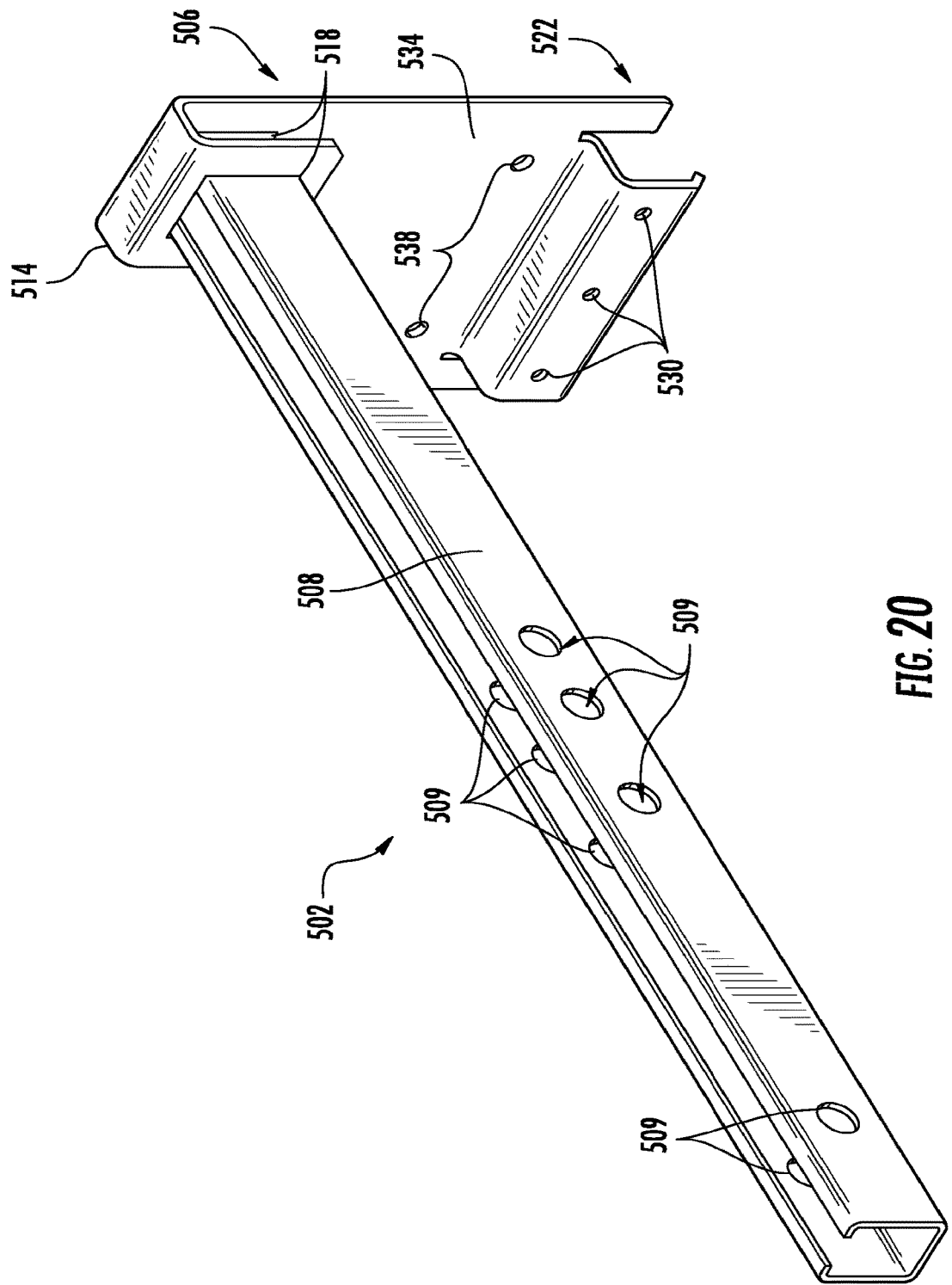
FIG. 20 is an isometric view of a first bracket portion of the flexible hose support bracket of FIG. 19.
Figure 21:
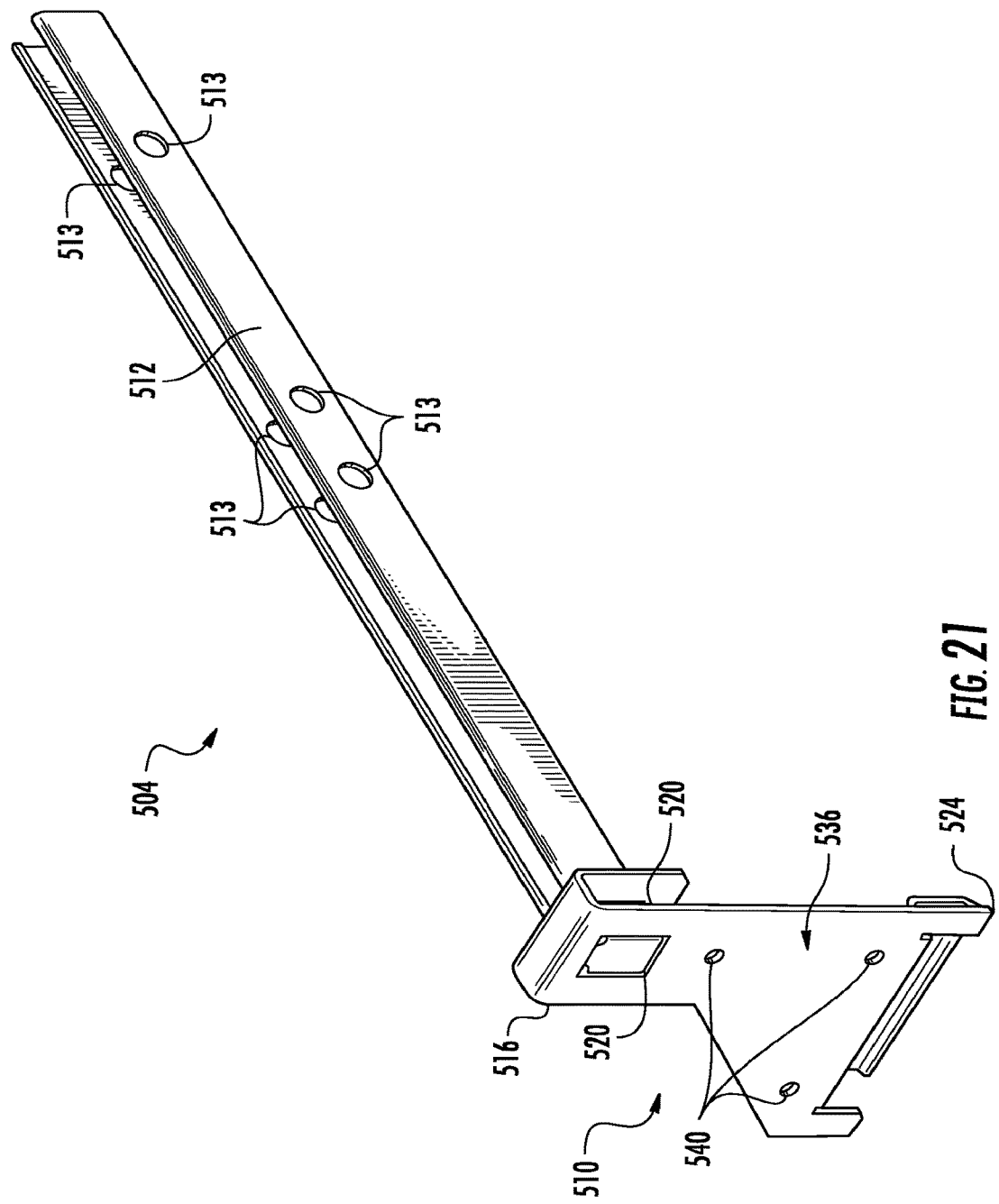
FIG. 21 is an isometric view of a second bracket portion the flexible hose support bracket of FIG. 19.

Referring now to FIG. 19-21, a further alternative flexible hose support bracket assembly 501 is shown. The flexible hose support bracket 501 may include first and second bracket portions 502, 504 that are telescopically adjustable with respect to each other to enable the bracket assembly 501 to be adjusted to fit a variety of ceiling structure spacings. The first bracket portion 502 may include a first leg 506 and a first bar element 508, while the second bracket portion 504 may include a second leg 510 and a second bar element 512. A hub assembly 503 may be supported on the first and/or second bar element 508, 512, and may be fixed in place along the bar elements via a set screw 505. The hub assembly 503 may be used to secure a sprinkler head fitting (not shown) to the flexible hose support bracket assembly 501.

The first and second legs 506, 510 of the flexible hose support bracket assembly 501 may be coupled at respective proximal ends 514, 516 to the first and second bar elements 508, 512, respectively. In the illustrated embodiment the first and second bar elements 508, 512 are received in openings 518, 520 formed in the proximal ends 514, 516 of the first and second legs 506, 510. As further illustrated, the proximal ends 514, 516 of the first and second legs 506, 510 are folded over to assume a U-shape such that the legs 506, 510 engage their respective bar elements 508, 512 at two spaced-apart locations, thus enhancing stability of the connection between the legs and bars. The first and second bar elements 508, 512 may be fixed to the first and second legs 506, 510 via any appropriate connection technique, a non-limiting example of which is welding.

The first and second bar elements 508, 512 may be of a similar geometric shape, and may be sized relative to each other so that one of the bar elements is receivable within the other bar element in a telescoping fashion. In the illustrated embodiment the first and second bar elements 508, 512 are channel members, and the channel of the first bar element 508 is sized to receive the second bar element 512 therein so that the first and second bracket portions 502, 504 are telescopically movable with respect to each other along an axis A-A of the flexible hose support bracket assembly 501. In this manner, the overall lateral dimension "L" of the support bracket assembly 501 can be adjusted to suit a particular installation configuration. It will be appreciated that although the first and second bar elements 508, 512 are shown as being channel members, that the bar elements can be any of a variety of other shapes as long as the bar elements permit adjustment of the lateral dimension "L" of the support bracket assembly 501.

As can be seen, the first and second bar elements 508, 512 each has a plurality of transversely oriented openings 509, 513. These openings 509, 513 are positioned to receive the set screw 505 of the hub assembly 503 therethrough to lock the first and second bar elements 508, 512 together once the lateral dimension "L" of the support bracket assembly 501 has been adjusted to a desired value. The set screw 505 also locks the position of the hub assembly 503 along the first and second bar elements 508, 512. The spacings between the openings enable the bracket to be adjusted to standard ceiling spacings (e.g., 24", 16", and 14.5" for studs). Also, for each specific ceiling spacing, the hub assembly 503 can be moved ¼ of the distance to either side of the middle.

The first and second legs 506, 510 may have distal ends 522, 524 configured to engage respective ceiling structural elements. In the illustrated embodiment the distal ends 522, 524 each have an elongated inverted U-shape for engaging respective T-bar beams (not shown) of a drop-ceiling support structure. The distal ends 522, 524 may each have at least one fastener 526, 528 received in respective openings 530, 532 in the distal ends. The fasteners 526, 528 may be used to positively fix the distal ends 522, 524 to the associated ceiling support structure members. The fasteners can be of any appropriate type, a non-limiting example of which is a self-tapping screw. The fasteners 526, 528 can be pre-installed in the openings 530, 532 to make it easier for the user to fix the first and second legs 506, 510 to the ceiling structure.

As can be seen, the first and second legs 506, 510 each have a central portion 534, 536 disposed between the distal and proximal ends. These central portions 534, 536 include a plurality of openings 538, 540 configured to receive fasteners such as screws for fixing the first and second legs 506, 510 to ceiling studs (not shown), where such an installation is desired or necessary.

Figure 22:
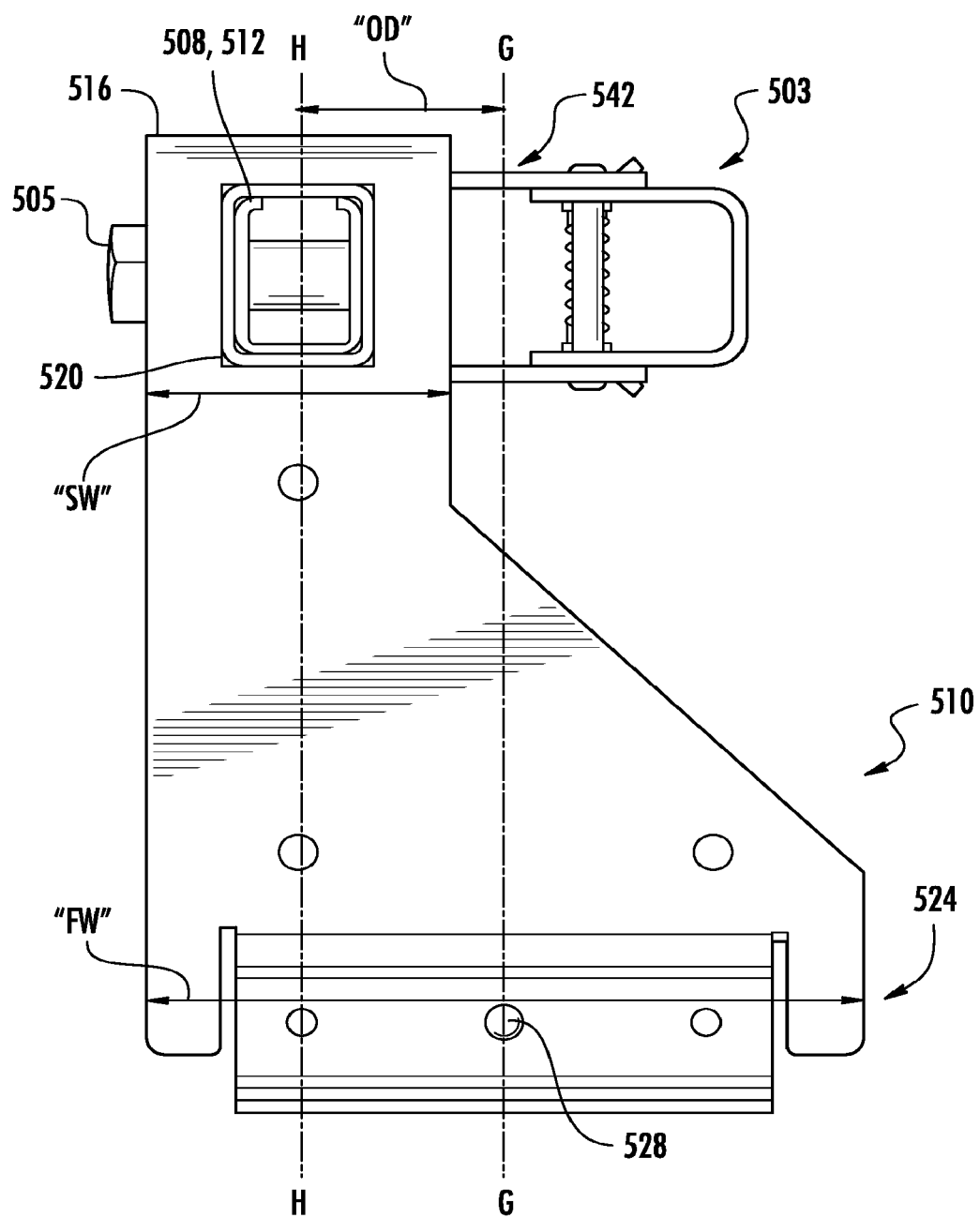
FIG. 22 is a side view of the flexible hose support bracket of FIG. 19.
Figure 23:
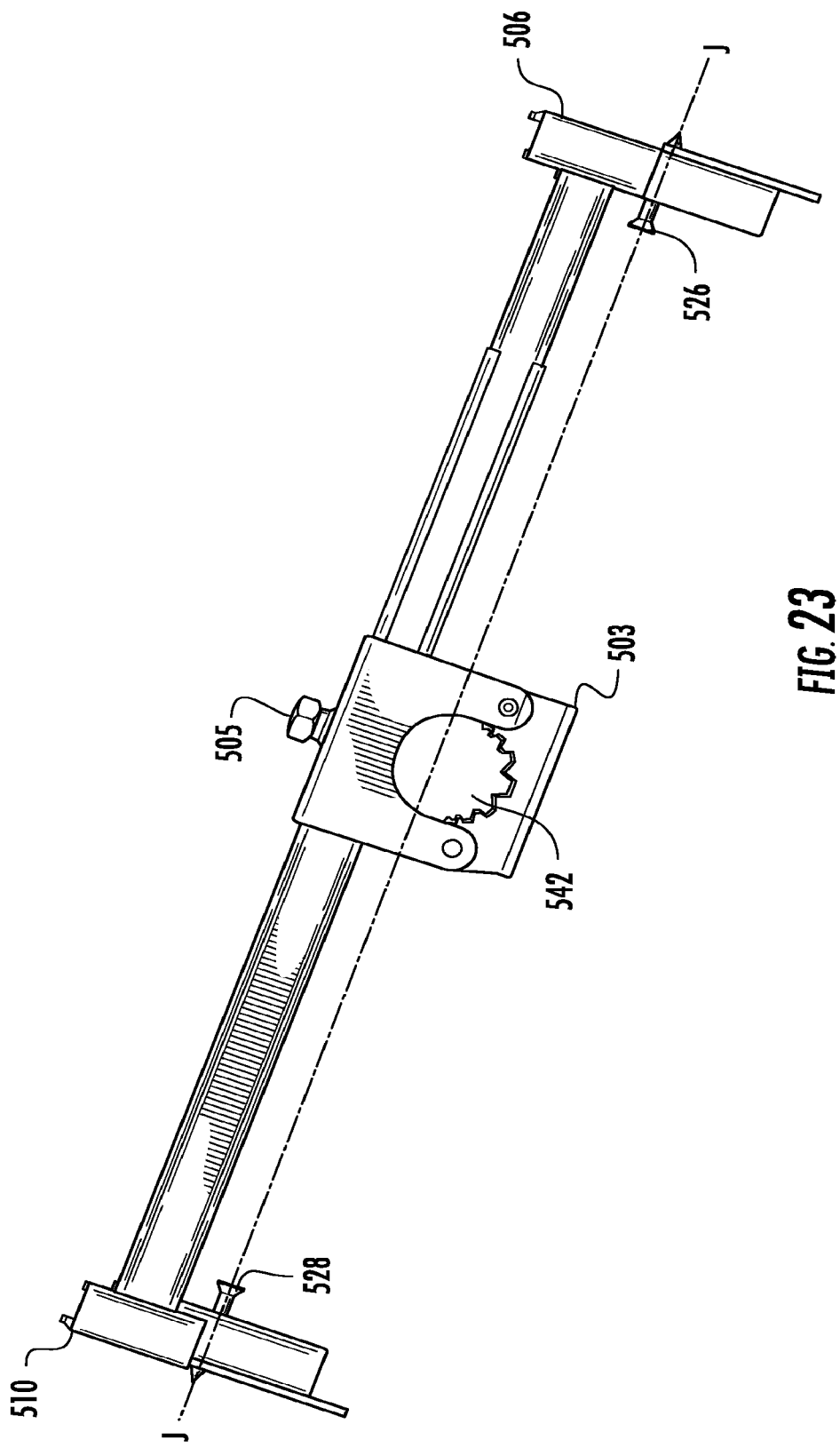
FIG. 23 is top plan view of the flexible hose support bracket of FIG. 19.

Referring to FIG. 22, a side view of the disclosed flexible hose support bracket assembly 501 is shown. Although only the second leg 510 is shown, it will be appreciated that the same features will apply to the first leg 506. The distal end 524 has a first width "FW" and the proximal end 516 has a second width "SW," where SW<FW. The second leg 510 has a first centerline G-G at the distal end 524, and a second centerline H-H at the proximal end 516. As can be seen, the first and second centerlines G-G and H-H are offset with respect to each other by an offset distance "OD." The openings 520 in the proximal end of the second leg 510 is centered on the second centerline H-H so as to center the first and second bar elements 508, 512 on the second centerline. The fastener 528 disposed in the distal end 524 of the second leg 510 is centered on the first centerline G-G. Thus, arranged, the offset distance "OD" is selected so that the first centerline G-G intersects the hub opening 542 in the hub assembly 503, thus aligning the hub opening with the centerline of the distal end as well as with the fastener 528 disposed in the distal end. This can also be seen in FIG. 23, which shows the fasteners 526, 528 aligned with the hub opening 542 in the hub assembly 503 along axis J-J.

During installation, by aligning the fastener 528 with appropriate markings on the ceiling frame, the hub opening 542 (and thus the sprinkler head) can automatically be aligned with the center of the ceiling tile without further adjustment. In addition, by aligning the fastener 528 with the hub opening 542, twisting force on the fastener 528 is minimized or eliminated during installation.

Figure 24:
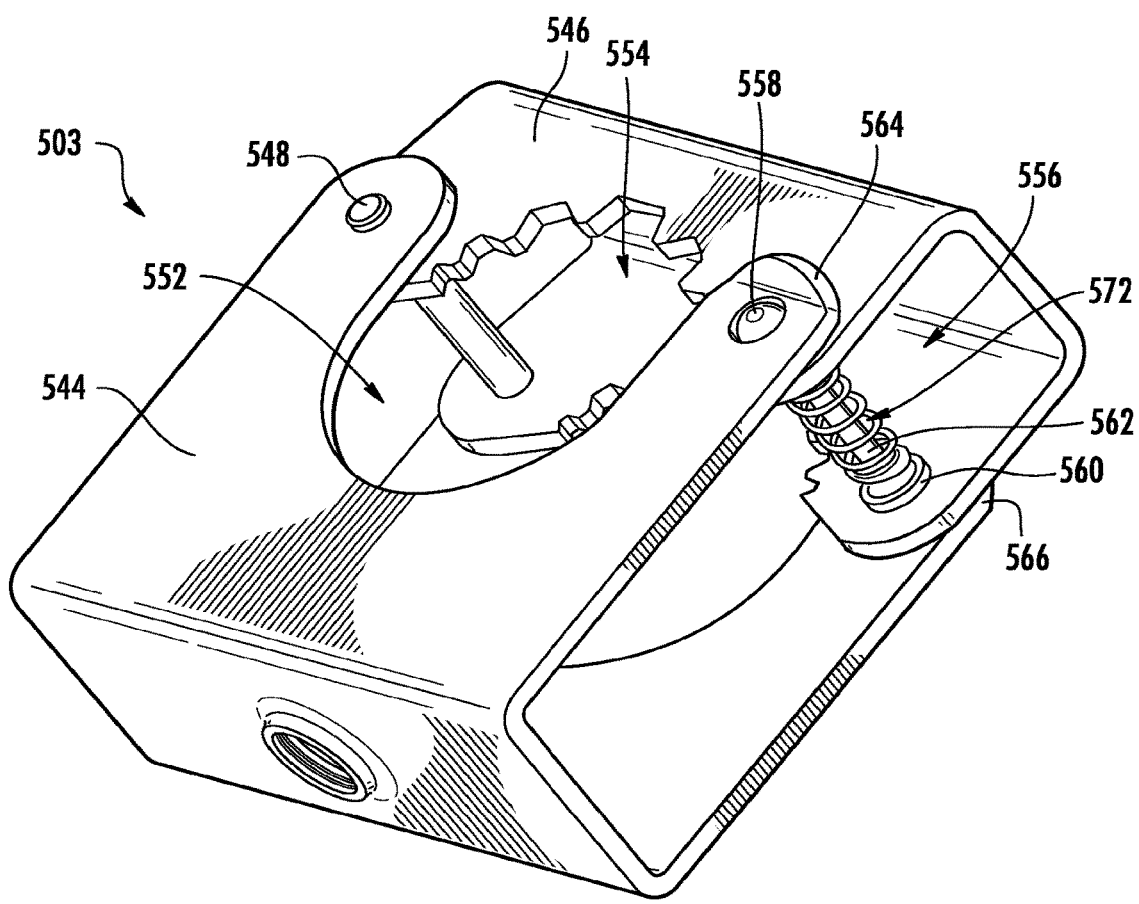
FIG. 24 is an isometric view of a hub assembly of the flexible hose support bracket of FIG. 19.
Figure 25A:
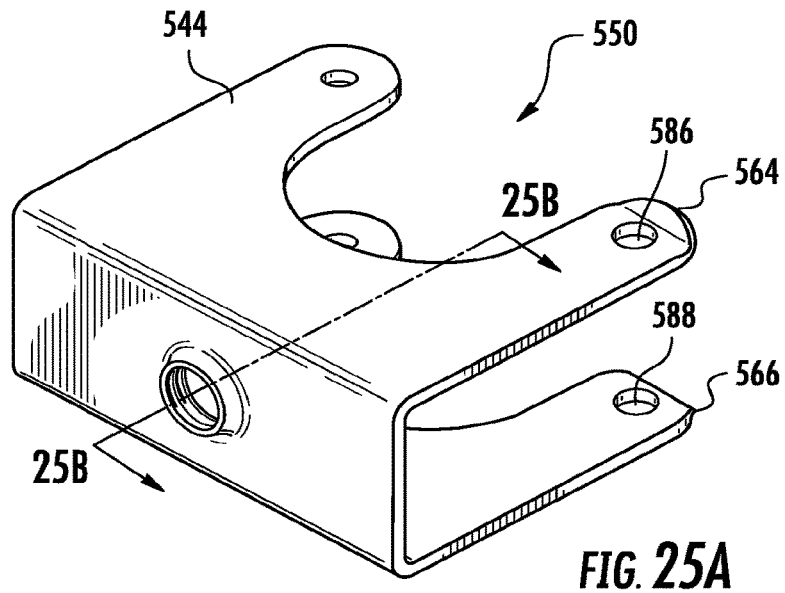
FIG. 25A is an isometric view of a primary support portion of the hub assembly of FIG. 24.
Figure 25B:
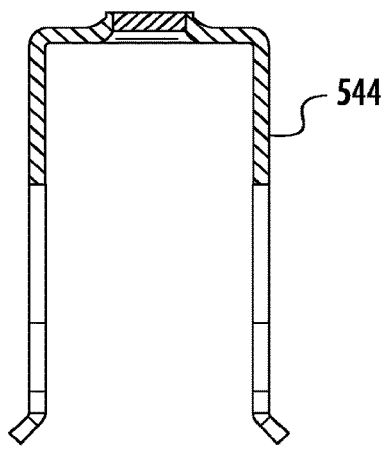
FIG. 25B is a cross-section view, taken along line 25B-25B of FIG. 25A.
Figure 25C:
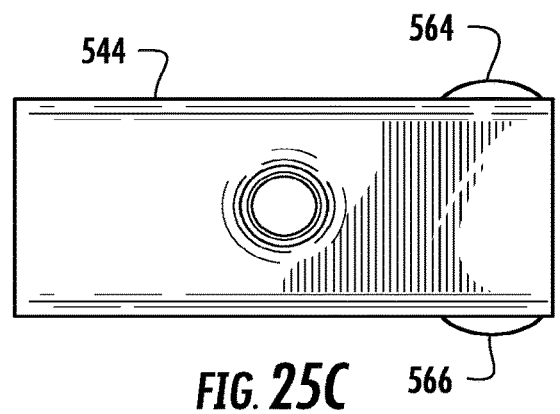
FIG. 25C is a side view of the primary support portion of the hub assembly of FIG. 24.
Figure 25D:
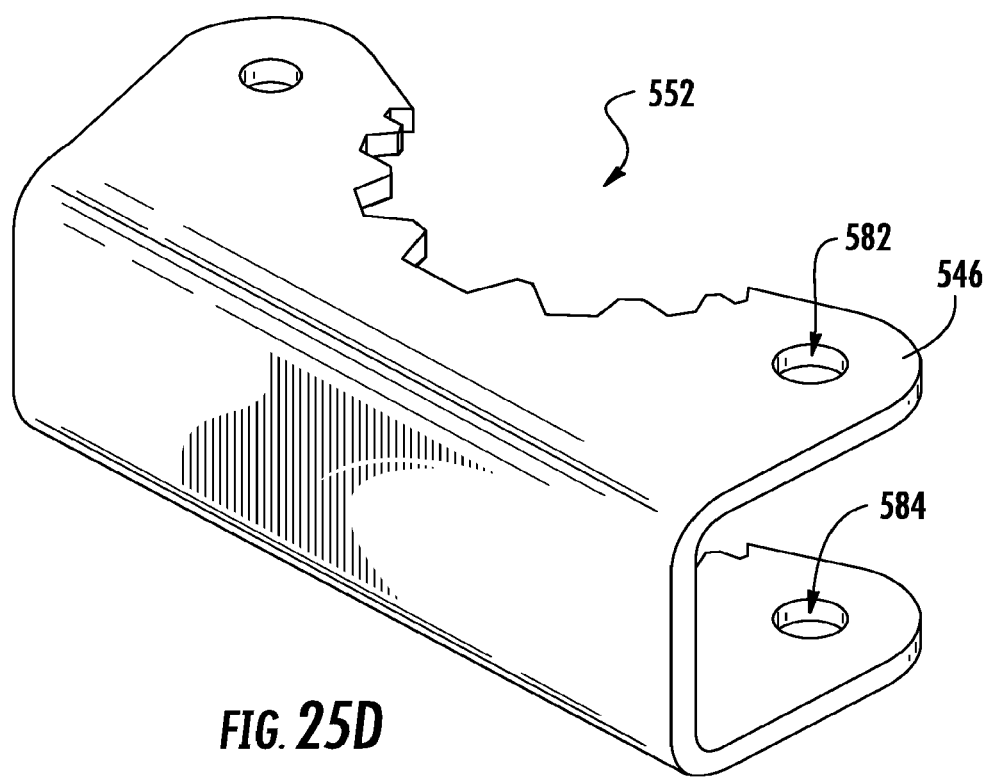
FIG. 25D is an isometric view of a secondary support portion of the hub assembly of FIG. 24.

FIGS. 24-25D show the hub assembly 503, which as previously noted can be used to secure a sprinkler head fitting (not shown) to the flexible hose support bracket assembly 501. The hub assembly 503 includes a primary support 544 which mounts on the first and/or second bar element 508, 512, and a secondary support 546 that is rotatably connected to the primary support 544 via a pin 548. The secondary support 546 rotates relative to the primary support 544 about the pin 548 between a closed position (shown) and an open position (see FIG. 26). The primary support 544 and secondary support 546 are each formed having cut out portions 550, 552 so that when the secondary support 546 is in the closed position relative to the primary support 544, the cut out 550 formed in the primary support cooperates with the cut out 552 formed in the secondary support 546 to define a hub opening 542 configured to receive and securely retain the sprinkler head fitting (not shown).

The hub assembly 503 includes a locking mechanism 556 that selectively connects locks the primary support 544 and the secondary support 546 in the closed position. The locking mechanism 556 can include a spring-loaded pin arrangement that enables the primary and secondary supports 544, 546 to be latched closed automatically without the need for a screw or lock.

Figure 25E:
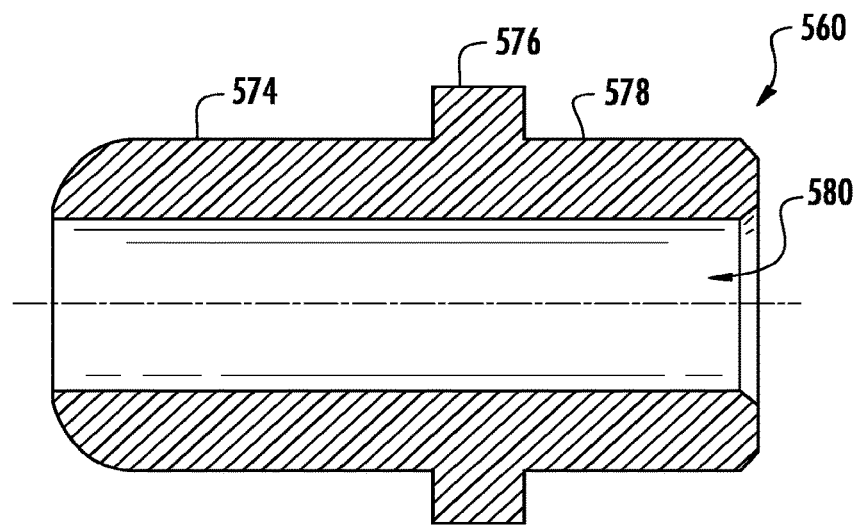
FIGS. 25E and 25F are first and second pin portions of the hub assembly of FIG. 24.
Figure 25F:
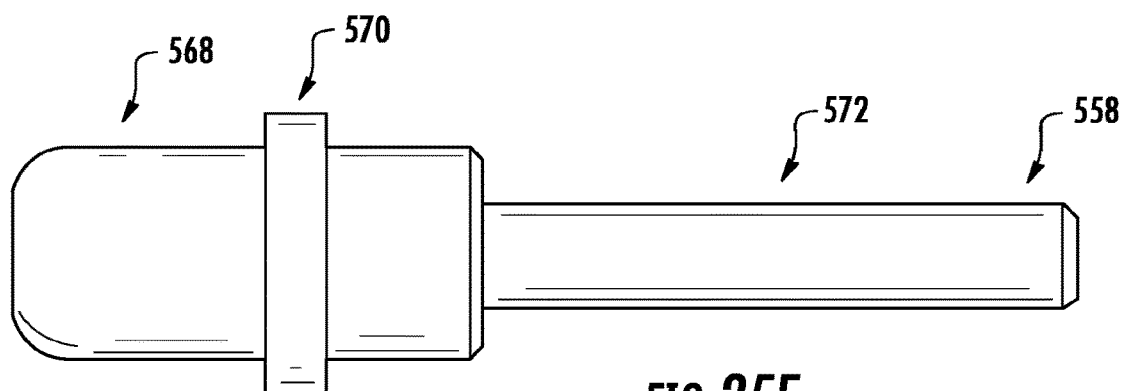

The locking mechanism 556 comprises first and second pin member 558, 560, a coil spring 562, and first and second flared jaw portions 564, 566 formed in the primary support. The first pin member 558 is shown in detail in FIG. 25F, while the second pin member 560 is shown in FIG. 25E. The first pin member 558 has a first head portion 568, a first circumferential shoulder portion 570, and a relatively thin first body portion 572. The second pin member 560 has a second head portion 574, a second circumferential shoulder portion 576, and a second body portion 578. The second pin member 560 also has a longitudinal bore 580 sized to receive the first body portion 572 of the first pin member 558 therein.

Figure 26:
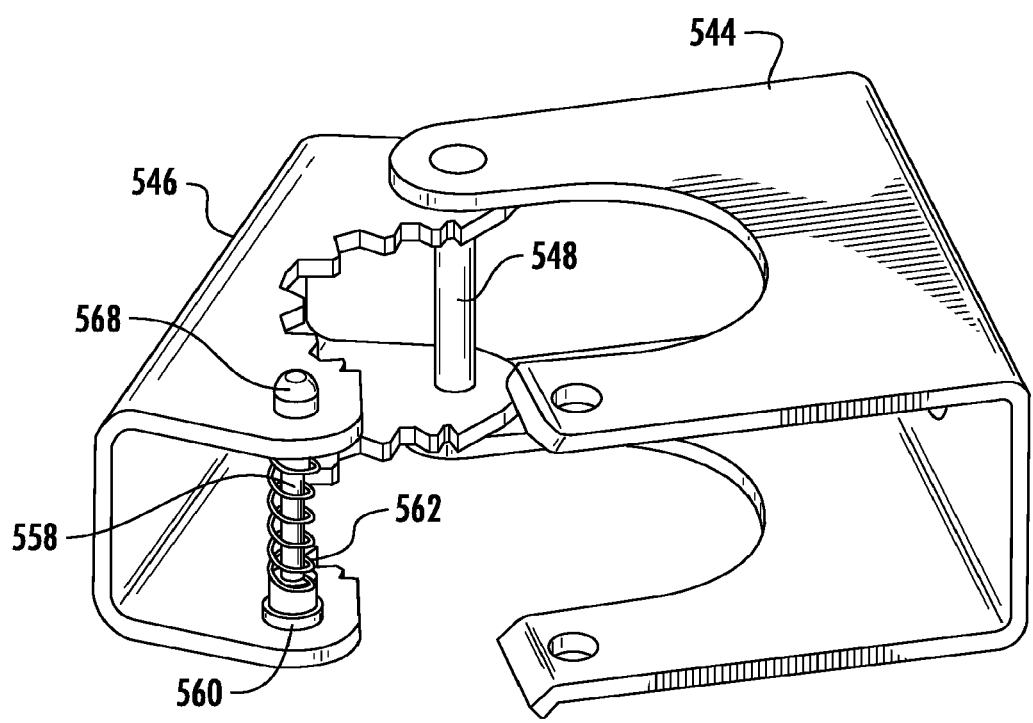
FIG. 26 is an isometric view of the hub assembly of FIG. 24 in the open position.

To assemble the locking mechanism 556, the coil spring 562 can be disposed about the first body portion 572 of the first pin member 558. The second pin member 560 can then be engaged with the first pin member 558 so that the first body portion 572 is received within the longitudinal bore 580. The first and second pin members 560 can be pressed toward each other to compress the coil spring 562 which engages facing surfaces of the first and second circumferential shoulder portions 570, 576. By reducing the overall length of the assembled first and second pin members 558, 560, the pin/spring assembly can be slid into engagement with first and second openings 582, 584 formed in the secondary support 546 (see FIG. 25D). When released, the first and second head portions 568, 574 of the first and second pin members are biased into the first and second openings 582, 584, and are held in position by the force of the coil spring 562. The first and second circumferential shoulder portions 570, 576 are sized to be larger than the first and second openings 582, 584, so that the first and second pin members 558, 560 remain engaged with the secondary support 546. The resulting configuration is shown in FIG. 26, illustrating the hub assembly 503 in the open configuration.

To lock the primary support 544 and the secondary support 546 in the closed position (so as to lock a sprinkler head fitting to the hub assembly 503), the secondary support 546 can be rotated about the pin 548 until the first and second head portions 568, 574 engage the first and second flared jaw portions 564, 566 of the primary support 544. Further rotation of the secondary support 546 about the pin 548 causes the first and second flared jaw portions 564, 566 to force the first and second head portions 568, 574 inward toward each other, against the outward bias of the coil spring 562, until the head portions are recessed within the first and second openings 582, 584 in the secondary support 546. The secondary support 546 can be rotated further until the first and second head portions 568, 574 align with third and fourth openings 586, 588 formed in the primary support. Upon alignment, the first and second head portions 568, 574 may be forced outward into the third and fourth openings by the bias of the coil spring 562, thereby locking the head portions within the third and fourth openings and locking the primary and secondary supports 544, 546 in the closed position. The primary and secondary support 544, 546 can be disconnected by reversing this operation.

Figure 27:
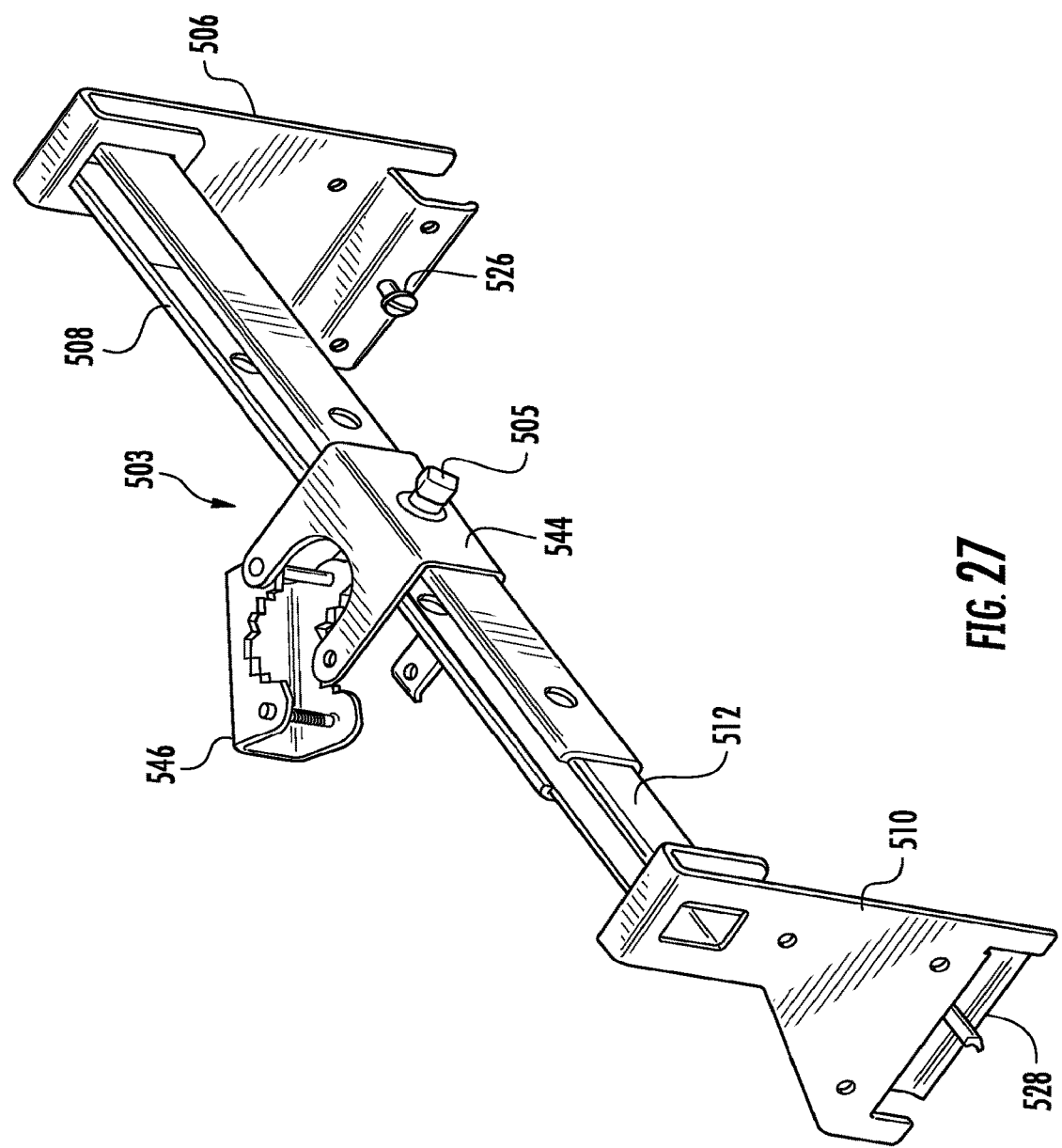
FIG. 27 is a reverse isometric view of the flexible hose support bracket of FIG. 19 with the hub assembly in the open position.
Figure 28:
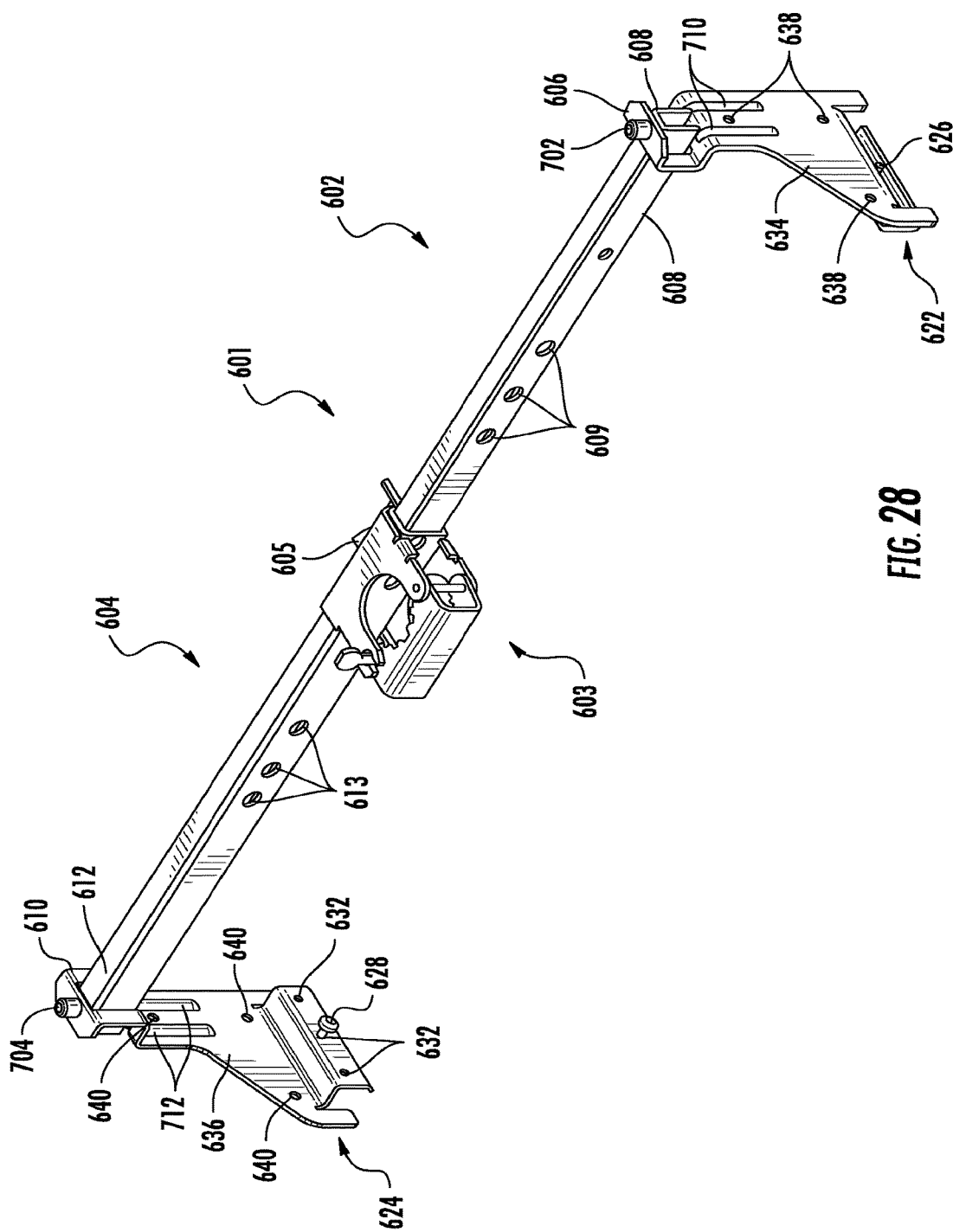
FIG. 28 is an isometric view of a further embodiment of a flexible hose support bracket.
Figure 29A:
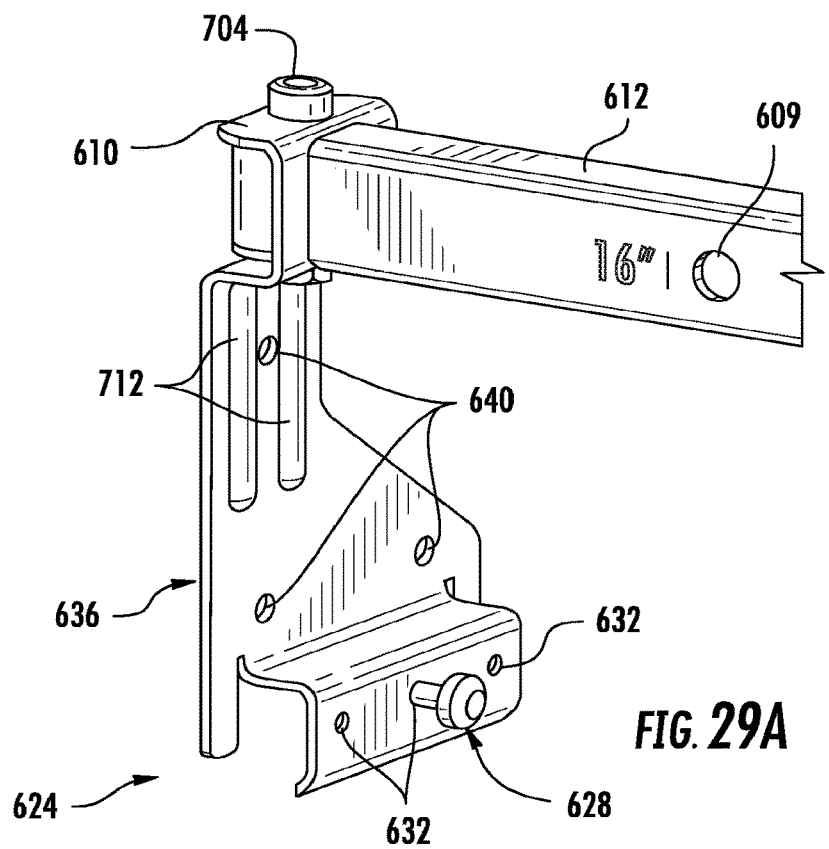
FIGS. 29A and 29B are partial isometric views of first and second bracket portions engaged with first and second bar elements of the flexible hose support bracket of FIG. 28.
Figure 29B:
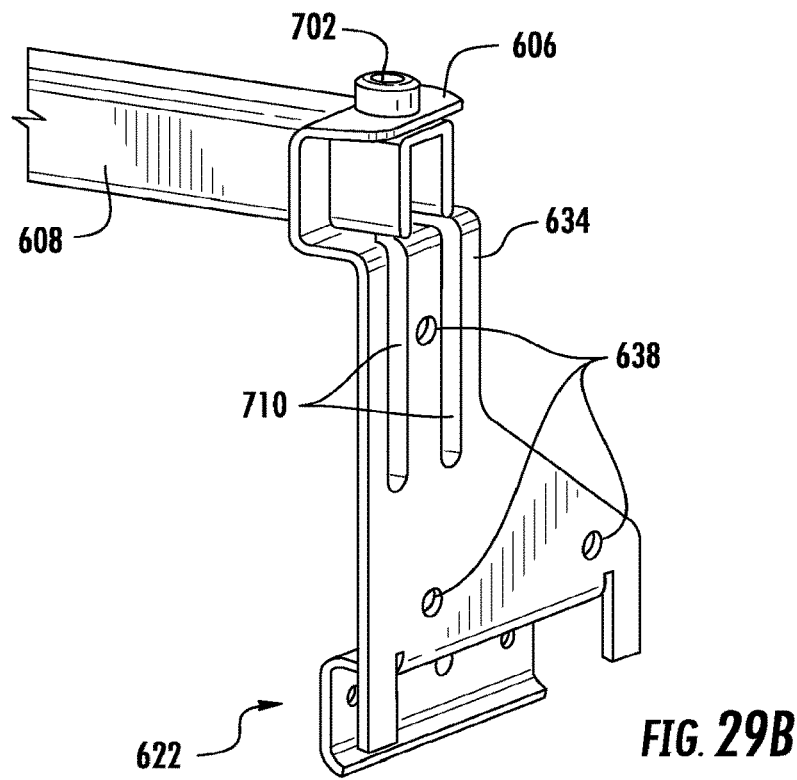

FIG. 27 shows the hub assembly 503 locked into position on the first and second bar elements 508, 512 by set screw 505. The hub assembly 503 is in the open configuration, ready for installation of a sprinkler head fitting.

FIGS. 28-31B show a further alternative embodiment of a flexible hose support bracket assembly 601, which includes an alternative arrangement for fixing the bar elements to respective legs of the assembly. As can be seen, the flexible hose support bracket assembly 601 may include first and second bracket portions 602, 604 that are telescopically adjustable with respect to each other to enable the bracket assembly 601 to be adjusted to fit a variety of ceiling structure spacings. The first bracket portion 602 may include a first leg 606 and a first bar element 608, while the second bracket portion 604 may include a second leg 610 and a second bar element 612. A hub assembly 603 may be supported on the first and/or second bar element 608, 612, and may be fixed in place along the bar elements via a set screw 605. The hub assembly 603 may be used to secure a sprinkler head fitting (not shown) to the flexible hose support bracket assembly 601 in a manner similar to, or the same as, that described in previous embodiments. The first and second bar elements 608, 612 may be engaged with respective first and second legs 606, 610 via openings 714, 716 (FIGS. 29A, 29B) formed in the first and second legs, respectively. First and second fasteners 702, 704 may be received in respective pairs of holes 706, 708 (FIGS. 29A, 29B) in the first and second legs 606, 610 to clamp the first and second bar elements 608, 612 to the first and second legs.

Figure 31A:
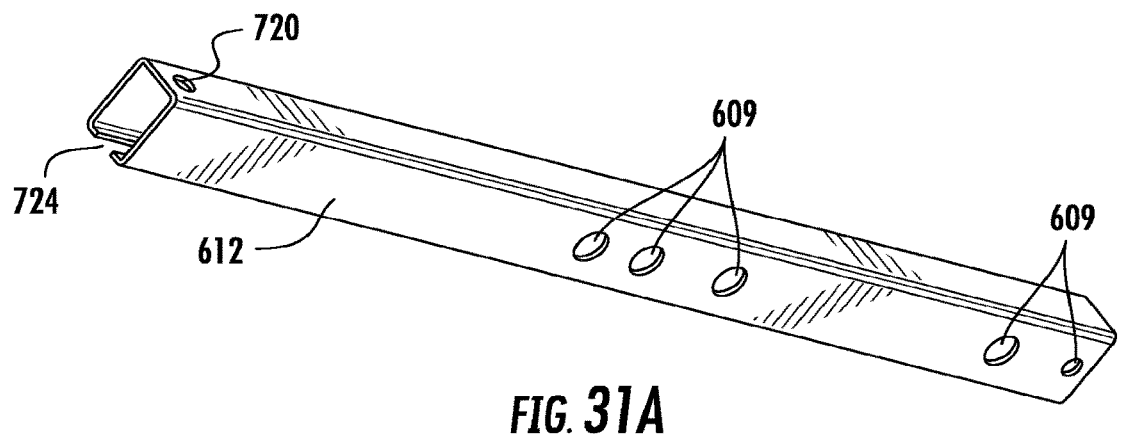
FIGS. 31A and 31B are isometric views of first and second bar elements of the flexible hose support bracket of FIG. 28.
Figure 31B:
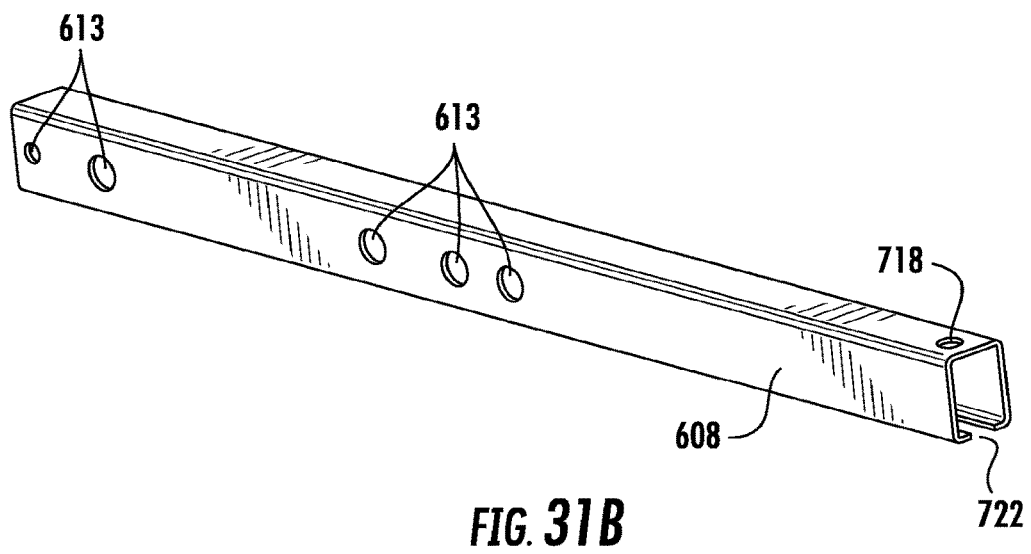

As can best be seen in FIGS. 31A and 31B, openings 718 and 720 formed in the bar elements 608, 612 may be aligned with holes 706, 708 of the first and second legs 606, 610 so that when the first and second fasteners 702, 704 are disposed therethrough, the fasteners may firmly lock the first and second bar elements 608, 612 in place. In some embodiments a nut (not shown) may be engaged with a distal end of each the first and second fasteners 702, 704 to secure first and second bar elements 608, 612 within respective openings 706, 708 of the first and second legs 606, 610.

The first and second bar elements 608, 612 may be of a similar geometric shape, and may be sized relative to each other so that one of the bar elements is receivable within the other bar element in a telescoping fashion. In the embodiment shown in FIGS. 31A, 31B, the first and second bar elements 608, 612 are channel members having respective channels 722, 724 therein. The channel 722 of the first bar element 608 may be sized to slidingly receive the second bar element 612 therein so that the first and second bracket portions 602, 604 are telescopically movable with respect to each other. As can be seen, the first and second bar elements 608, 612 also each have a plurality of transversely oriented openings 609, 613. These openings 609, 613 may be positioned to receive the set screw 605 of the hub assembly 603 therethrough to lock the first and second bar elements 608, 612 together once a lateral dimension of the support bracket assembly 601 has been adjusted to a desired value. As will be appreciated, locking the set screw 605 also serves to lock the hub assembly 603 to the first and second bar elements 608, 612.

The first and second legs 606, 610 can have distal ends 622, 624 configured to engage respective ceiling structural elements. In the illustrated embodiment the distal ends 622, 624 each have an elongated inverted U-shape for engaging respective T-bar beams (not shown) of a drop-ceiling support structure. The distal ends 622, 624 may each have at least one fastener 626, 628 received in respective openings 630, 632 in the distal ends. The fasteners 626, 628 may be used to positively fix the distal ends 622, 624 to the associated ceiling support structure members. The fasteners can be of any appropriate type, a non-limiting example of which is a self-tapping screw. The fasteners 626, 628 can be pre-installed in the openings 630, 632 to make it easier for the user to fix the first and second legs 606, 610 to the ceiling structure.

In the illustrated embodiment the first and second bar elements 608, 612 are oriented such that the respective channels 722, 724 open "downward" toward the distal ends 622, 624 of the first and second brackets 606, 610. Such an orientation may enhance rigidity of the overall assembly, but is not critical. Thus, in some versions of the disclosed embodiments the first and second bar elements can be oriented such that their respective channels open "upward" away from the distal ends of the first and second brackets. In addition, it will be appreciated that the size, shape and wall thickness of the first and second bar elements 608, 612 (as well as the first and second bar elements of the previously described embodiments) may be selected to achieve a desired strength, rigidity and robustness.

Figure 30A:
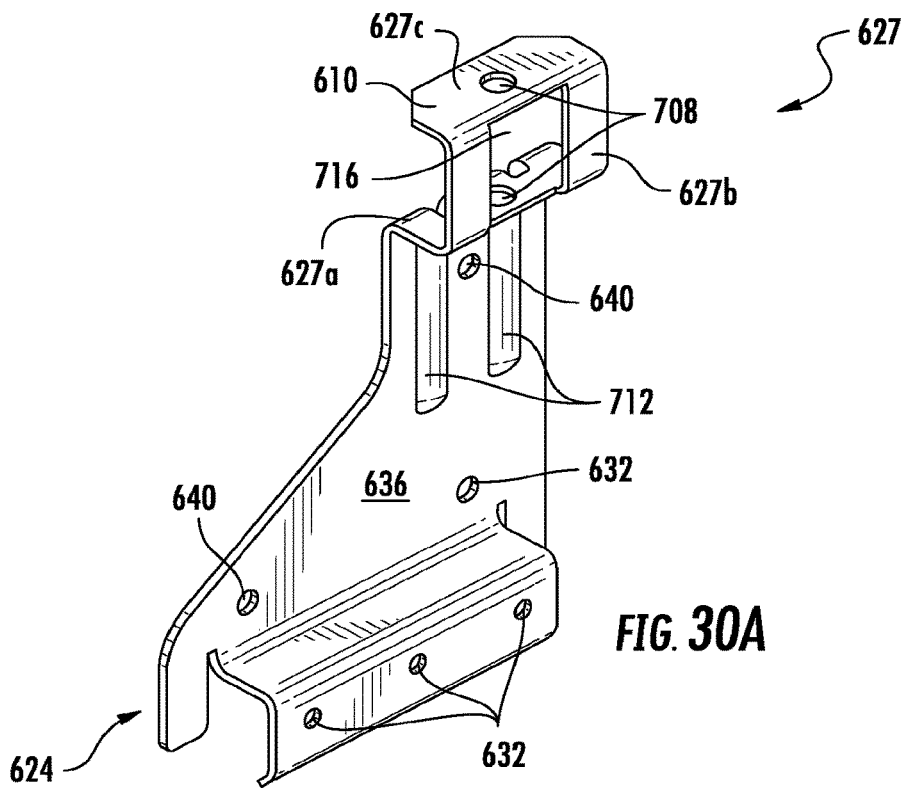
FIGS. 30A and 30B are isometric views of first and second bracket portions of the flexible hose support bracket of FIG. 28.
Figure 30B:
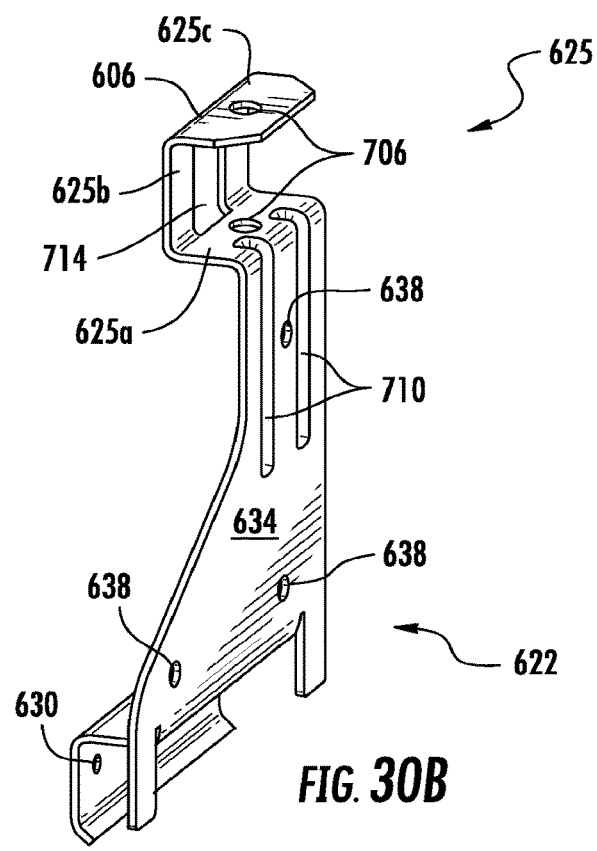

As can best be seen in FIGS. 30A and 30B, the first and second legs 606, 610 each have a central portion 634, 636 disposed between the distal and proximal ends. These central portions 634, 636 can include a plurality of openings 638, 640 configured to receive fasteners such as screws for fixing the first and second legs 606, 610 to ceiling studs (not shown), where such an installation is desired or necessary. In some embodiments the central portions 634, 636 of the first and second legs 606, 610 may include features intended to enhance the strength and/or rigidity of the legs. In the illustrated embodiment, each of the central portions 634, 636 include a pair of vertically oriented stiffening members 710, 712. These stiffening members 710, 712 may comprise discrete raised sections that are formed by stamping, pressing, or the like. resulting in elongated discontinuities in the central portions 634, 636 of the first and second legs 606, 610. As will be appreciated, providing such raised discontinuities in the central portions 634, 636 may substantially enhance the stiffness of the first and second legs 606, 610. It will also be appreciated that although the illustrated embodiment shows two elongated stiffening members 710, 712, that other shapes, numbers, configurations and sizes of stiffening members can be used to achieve a desired strengthening of the first and second legs 606, 610.

The manner in which the first and second legs 606, 610 engage their respective bar elements 608, 612 will now be described in greater detail. The first and second legs 606, 610 each may each have a proximal portion 625, 627, and each proximal portion may have features configured to engage and retain an end of a respective bar element 608, 612. In the illustrated embodiment the proximal portions 625, 627 may have a C-shape that can be employed to clamp a respective bar elements 608, 612 in place. Thus, the proximal portions 625, 627 can each be divided into first, second and third sub-portions 625a, 625b, 625c, 627a, 627b, 627c. The first and third sub-portions 625a, 625c of the first leg 606 may be oriented substantially parallel with each other, and parallel to the first bar element 608 when assembled. The second sub-portion 625b of the first leg 606 may be oriented substantially perpendicular to the first and third sub-portions 625a, 625c, and perpendicular to the first bar element 608 when assembled. The second sub-portion 625b may contain the opening 714 for receiving the first bar element 608 therein. Similarly, with respect to second leg 610, the first and third sub-portions 627a, 627c may be oriented substantially parallel to each other, and parallel to the second bar element 612 when assembled, while the second sub-portion 627b may be oriented substantially perpendicular to the first and third sub-portions 627a, 627c, and perpendicular to the second bar element 612 when assembled. The second sub-portion 627*b* may contain the opening 716 for receiving the second bar element 612 therein. The first and third sub-portions 625*a*, 625*c*; 627*a*, 627*c* may have respective openings for receiving a fastener 702, 704 therethrough.

Thus arranged, when the first and second bar elements 608, 612 are disposed in the respective openings 714, 716 of the first and second legs 606, 610, the first and second fasteners 702, 704 (FIGS. 29A, 29B) can be tightened to force the first and third sub-portions 625*a*, 625*b*, 627*a*, 627*b* toward each other, thereby clamping the first and second bar elements 608, 612 to the first and second legs. In one embodiment the fasteners 702, 704 comprise nut/bolt combinations, though other fastener types can also be used without departing from the disclosure.

As can be seen, in the illustrated embodiment the stiffening members 710, 712 can extend from the central portions 634, 636 of the first and second legs 606, 610 into the proximal portions 625, 627. Specifically, the stiffening members 710, 712 may extend into the first sub-portions 625*a*, 627*a* (FIGS. 30A, 30B) of the proximal portions 625, 627

FIG. 32 shows the disclosed flexible hose support bracket assembly mounted within a ceiling 300 having a ceiling frame 302 of rectangular frame sections. Although the structure in these figures shows the flexible hose support bracket assembly 601 of FIGS. 28-31B, it will be appreciated that any of the flexible hose support bracket assemblies 1, 100, 501, 601 of FIGS. 1-31B can be installed within a ceiling in the same or similar manner. In some embodiments the ceiling frame 302 may be a suspended ceiling. A fire sprinkler system 400 can include supply pipes 402 as part of a fire suppression fluid delivery system. The fire sprinkler system 400 can also include a flexible hose 404 which can couple, via a union nut 406 to the sprinkler drop nipple 202. A ceiling panel 304 may be positioned within a section of the ceiling frame 302, and a sprinkler head 408 may be coupled to a distal end of the sprinkler drop nipple 202, below an opening in the ceiling panel.

While the flexible hose support bracket assembly has been disclosed with reference to certain embodiments, numerous modifications, alterations and changes to the described embodiments are possible without departing from the spirit and scope of the invention, as defined in the appended claims. For example, any of the embodiments disclosed herein can include any or all of the features of any other embodiment disclosed herein. Accordingly, it is intended that the present disclosure not be limited to the described embodiments, but that it has the full scope defined by the language of the following claims, and equivalents thereof.

What is claimed is:

1. A hub assembly for engaging a flexible hose component to an adjustable bracket, the hub assembly comprising:
 a primary support comprising:
  an upper plate portion and a lower plate portion, wherein the upper plate portion includes a first opening aligned with a second opening of the lower plate portion, and wherein the first opening and the second opening are each operable to receive a pin therethrough; and
  a side plate portion connecting the upper plate portion and the lower plate portion;
 a secondary support rotatably coupled to the primary support, wherein the primary support and the secondary support each include a cut out portion such that when the secondary support is in a closed position relative to the primary support, the cut out portion of the primary support cooperates with the cut out portion formed in the secondary support to define a hub opening operable to receive and securely retain a sprinkler drop nipple, the secondary support comprising:
  a second upper plate portion and a second lower plate portion connected by a second side plate portion; and
  a slot disposed in each of the second upper plate portion and the second lower plate portion, the slot having a slot axis that is substantially parallel to a plane of the second side plate portion, and wherein the slot is operable to receive the pin therein to couple the secondary support to the primary support; and
 a locking mechanism for securing the primary support and the secondary support together, the locking mechanism comprising:
  a bolt coupled to the primary support; and
  a fastener secured to the bolt, the fastener operable to directly engage the secondary support.

2. The hub assembly of claim 1, wherein a set of interior surfaces of the upper plate portion and the lower plate portion define the cut out portion of the primary support.

3. The hub assembly of claim 1, the slot further enabling the secondary support to translate with respect to the primary support.

4. The hub assembly of claim 1, the secondary support further comprising a lateral recess formed in the second side plate portion, wherein the lateral recess is operable to receive a shank portion of the bolt.

5. The hub assembly of claim 1, further comprising a cross member extending between the upper plate portion and the lower plate portion, the cross member including an opening for receiving the bolt.

6. The hub assembly of claim 5, the cross member comprising:
 a first side facing the side plate portion of the primary support; and
 a second side, opposite the first side, the second side facing the second side plate portion of the secondary support, wherein a head portion of the bolt is disposed on the first side, and wherein a free end of the bolt extends away from the second side.

7. The hub assembly of claim 1, wherein the side plate portion includes a set of lateral recesses open towards one or more sides of the primary support.

8. The hub assembly of claim 1, wherein the fastener is a wing nut rotatably secured about the bolt, the wing nut engaging the second side plate portion of the secondary support.

9. A hub assembly for securing a flexible hose component to an adjustable bracket, the hub assembly comprising:
 a primary support rotatably coupled with a secondary support, wherein the primary support and the secondary support each include a cut out portion such that when the secondary support is in a closed position relative to the primary support, the cut out portion of the primary support cooperates with the cut out portion formed in the secondary support to define a hub opening operable to receive and securely retain a sprinkler drop nipple, the primary support comprising:
  an upper plate portion and a lower plate portion, wherein the upper plate portion includes a first opening aligned with a second opening of the lower plate portion, and wherein the first opening and the second opening are each operable to receive a pin therethrough; and
  a side plate portion connecting the upper plate portion and the lower plate portion;

a locking mechanism for securing the primary support and the secondary support together, the locking mechanism comprising:
  a bolt coupled to the primary support; and
  a fastener secured to the bolt, the fastener operable to directly engage the secondary support; and
a cross member disposed between the primary support and the secondary support, the cross member including an opening for receiving the bolt; and
wherein the secondary support comprises:
  a second upper plate portion and a second lower plate portion connected by a second side plate portion; and
  a slot disposed in each of the second upper plate portion and the second lower plate portion, the slot having a slot axis that is substantially parallel to a plane of the second side plate portion, wherein the slot is operable to receive the pin therein to couple the secondary support to the primary support, and wherein the slot enables the secondary support to translate with respect to the primary support.

10. The hub assembly of claim 9, wherein a set of interior surfaces of the upper plate portion and the lower plate portion define the cut out portion of the primary support.

11. The hub assembly of claim 9, the secondary support further comprising a lateral recess formed in the second side plate portion, wherein the lateral recess is operable to receive a shank portion of the bolt laterally therethrough.

12. The hub assembly of claim 9, wherein the cross member extends between the upper plate portion and the lower plate portion of the primary support, and between the second upper plate portion and the second lower plate portion of the secondary support.

13. The hub assembly of claim 12, the cross member comprising:
  a first side facing the side plate portion of the primary support, wherein the first side is engaged with the upper plate portion and the lower plate portion of the primary support; and
  a second side, opposite the first side, the second side facing the second side plate portion of the secondary support, wherein the second side is engaged with the second upper plate portion and the second lower plate portion of the secondary support, and wherein a head portion of the bolt is disposed on the first side, and wherein a free end of the bolt extends away from the second side.

14. A hub assembly for securing a flexible hose component to an adjustable bracket, the hub assembly comprising:
  a primary support rotatably coupled with a secondary support, wherein the primary support and the secondary support each include a cut out portion such that when the secondary support is in a closed position relative to the primary support, the cut out portion of the primary support cooperates with the cut out portion formed in the secondary support to define a hub opening operable to receive and securely retain a sprinkler drop nipple;
  a locking mechanism for securing the primary support and the secondary support together, the locking mechanism comprising:
    a bolt coupled to the primary support; and
    a fastener secured to the bolt, the fastener operable to directly engage the secondary support; and
  a cross member disposed between the primary support and the secondary support, the cross member comprising:
    a first side engaged with the primary support; and
    a second side, opposite the first side, the second side engaged with the secondary support, and wherein a head portion of the bolt is disposed on the first side, and wherein a shank portion of the bolt extends away from the second side and through the secondary support.

15. The hub assembly of claim 14, the primary support comprising:
  an upper plate portion and a lower plate portion, wherein the upper plate portion includes a first opening aligned with a second opening of the lower plate portion, and wherein the first opening and the second opening are each operable to receive a pin therethrough; and
  a side plate portion connecting the upper plate portion and the lower plate portion.

16. The hub assembly of claim 15, the secondary support comprising:
  a second upper plate portion and a second lower plate portion connected by a second side plate portion; and
  a slot disposed in each of the second upper plate portion and the second lower plate portion, the slot having a slot axis that is substantially parallel to a plane of the second side plate portion, wherein the slot is operable to receive the pin therein to couple the secondary support to the primary support, and wherein the slot enables the secondary support to translate with respect to the primary support.

17. The hub assembly of claim 16, the secondary support further comprising a lateral recess formed in the second side plate portion, wherein the lateral recess is operable to receive the shank portion of the bolt.

18. The hub assembly of claim 16, wherein the first side of the cross member is engaged with the upper plate portion and the lower plate portion of the primary support, and wherein the second side of the cross member is engaged with the second upper plate portion and the second lower plate portion of the secondary support.

19. A hub assembly for engaging a flexible hose component to an adjustable bracket, the hub assembly comprising:
  a primary support comprising:
    an upper plate portion and a lower plate portion, wherein the upper plate portion includes a first opening aligned with a second opening of the lower plate portion, and wherein the first opening and the second opening are each operable to receive a pin therethrough; and
    a side plate portion connecting the upper plate portion and the lower plate portion;
  a secondary support rotatably coupled to the primary support, wherein the primary support and the secondary support each include a cut out portion such that when the secondary support is in a closed position relative to the primary support, the cut out portion of the primary support cooperates with the cut out portion formed in the secondary support to define a hub opening operable to receive and securely retain a sprinkler drop nipple;
  a locking mechanism for securing the primary support and the secondary support together, the locking mechanism comprising:
    a bolt coupled to the primary support; and
    a fastener secured to the bolt, the fastener operable to directly engage the secondary support; and
  a cross member extending between the upper plate portion and the lower plate portion, the cross member including an opening for receiving the bolt, the cross member comprising:

a first side facing the side plate portion of the primary support; and a second side, opposite the first side, the second side facing the secondary side plate portion of the secondary support, wherein a head portion of the bolt is disposed on the first side, and wherein a free end of the bolt extends away from the second side.

20. The hub assembly of claim 19, wherein the side plate portion includes a set of lateral recesses open towards one or more sides of the primary support.

21. The hub assembly of claim 19, wherein a set of interior surfaces of the upper plate portion and the lower plate portion define the cut out portion of the primary support.

22. A hub assembly for engaging a flexible hose component to an adjustable bracket, the hub assembly comprising:

a primary support comprising:

an upper plate portion and a lower plate portion, wherein the upper plate portion includes a first opening aligned with a second opening of the lower plate portion, and wherein the first opening and the second opening are each operable to receive a pin therethrough; and a side plate portion connecting the upper plate portion and the lower plate portion, the side plate portion including a set of lateral recesses open towards one or more sides of the primary support;

a secondary support rotatably coupled to the primary support, wherein the primary support and the secondary support each include a cut out portion such that when the secondary support is in a closed position relative to the primary support, the cut out portion of the primary support cooperates with the cut out portion formed in the secondary support to define a hub opening operable to receive and securely retain a sprinkler drop nipple; and a locking mechanism for securing the primary support and the secondary support together, the locking mechanism comprising:

a bolt coupled to the primary support; and a fastener secured to the bolt, the fastener operable to directly engage the secondary support.

23. The hub assembly of claim 22, wherein a set of interior surfaces of the upper plate portion and the lower plate portion define the cut out portion of the primary support.

* * * * *